(12) United States Patent
Miyazawa

(10) Patent No.: US 7,224,102 B2
(45) Date of Patent: May 29, 2007

(54) OPERATING APPARATUS AND AN ELECTRIC INSTRUMENT

(75) Inventor: Osamu Miyazawa, Shimasuwa-machi (JP)

(73) Assignee: Seiko Epson Corporation (JP)

( * ) Notice: Subject to any disclaimer, the term of this patent is extended or adjusted under 35 U.S.C. 154(b) by 76 days.

(21) Appl. No.: 10/817,441

(22) Filed: Apr. 2, 2004

(65) Prior Publication Data

US 2004/0256956 A1    Dec. 23, 2004

(30) Foreign Application Priority Data

Apr. 3, 2003   (JP) .............................. 2003-100100
Jan. 28, 2004  (JP) .............................. 2004-020521

(51) Int. Cl.
     *H01L 41/08* (2006.01)
(52) U.S. Cl. ................................. 310/323.02
(58) Field of Classification Search ........... 310/323.02, 310/323.12, 323.18, 328
     See application file for complete search history.

(56) References Cited

U.S. PATENT DOCUMENTS

| | | | | |
|---|---|---|---|---|
| 4,453,103 A | * | 6/1984 | Vishnevsky et al. ... | 310/323.02 |
| 5,332,941 A | * | 7/1994 | Honda .................... | 310/323.02 |
| 5,696,421 A | * | 12/1997 | Zumeris et al. ............. | 310/328 |
| 6,064,140 A | * | 5/2000 | Zumeris ................. | 310/323.02 |
| 6,384,514 B1 | * | 5/2002 | Slutskiy et al. ......... | 310/323.17 |
| 6,384,515 B1 | * | 5/2002 | Ganor et al. ................. | 310/328 |
| 6,617,759 B1 | * | 9/2003 | Zumeris et al. ......... | 310/323.17 |

FOREIGN PATENT DOCUMENTS

| | | |
|---|---|---|
| JP | 11-250225 | 9/1999 |
| JP | WO00/38309 | 6/2000 |

\* cited by examiner

*Primary Examiner*—Darren Schuberg
*Assistant Examiner*—Karen Addison
(74) *Attorney, Agent, or Firm*—Harness, Dickey & Pierce, P.L.C.

(57) ABSTRACT

An operating apparatus 1 of the present invention has a driven element 5, a frame 4 having a contacted element 51 and rotatably supporting the driven element 5, and an ultrasonic motor. The ultrasonic motor includes a vibrating element 6. The vibrating element 6 includes a first piezoelectric element 62 that undergoes extension and contraction by application of an AC voltage, a reinforcing plate 63 having a contact portion 66 and an arm portion 68, and a second piezoelectric element 64 that undergoes extension and contraction by application of an AC voltage. The first piezoelectric element 62, the reinforcing plate 63, and the second piezoelectric element 64 are laminated in this order. The vibrating element 6 is fixedly mounted on the driven element 5 in a state where the contact portion 66 abuts on the contacted element 51. Further, the vibrating element 6 receives reaction force from the contacted element 51 when the vibrating element 6 vibrates so that the driven element 5 is rotated together with the vibrating element 6 by means of the reaction force.

20 Claims, 28 Drawing Sheets

OPERATING APPARATUS AND AN ELECTRIC INSTRUMENT

CROSS REFERENCE TO RELATED APPLICATIONS

This application claims priority to Japanese Patent Application Nos. 2003-100100 filed Apr. 3, 2003 and 2004-020521 filed Jan. 28, 2004, which are hereby expressly incorporated by reference herein in their entireties.

TECHNICAL FIELD

The present invention is related to an operating apparatus and an electric instrument.

BACKGROUND ART

So far, operating apparatuses that drive a driven element such as a pan-tilt type zoom camera or the like are well known. In such an ultrasonic motor, a technology described in a website (URL: http://www.viwemedia. co.jp/kiki/vcc4.htm (Japanese only)) is known as the above-mentioned technology.

However, in conventional operating apparatuses, since a drive mechanism of the driven element is constructed from a large motor such as an electromagnetic motor, there is a problem that the entire apparatus becomes a large size.

SUMMARY OF THE INVENTION

It is an object of the present invention to provide an operating apparatus and an electric instrument that can minimize a size of the entire apparatus.

In order to achieve the above-mentioned object, in one aspect of the invention, the present invention is directed to an operating apparatus.

The operating apparatus comprises:
a driven element;
a frame which rotatably supports the driven element;
a contacted element which is stationary with respect to the frame; and
a vibrating element which includes a first piezoelectric element that undergoes extension and contraction by application of an AC voltage, a reinforcing plate having a contact portion and an arm portion, and a second piezoelectric element that undergoes extension and contraction by application of an AC voltage, the first piezoelectric element, the reinforcing plate and the second piezoelectric element being laminated in this order, and the vibrating element being fixedly mounted on the driven element in a state where the contact portion abuts on the contacted element;
wherein the vibrating element receives reaction force from the contacted element when the vibrating element vibrates so that the driven element is rotated together with the vibrating element by means of the reaction force.

According to this invention, since an operating mechanism for the driven element is constructed using an ultrasonic motor having a laminated structure, it is possible to make the entire apparatus smaller and thinner.

In particular, since the vibrating element is constructed so that the first piezoelectric element that undergoes extension and contraction by application of an AC voltage, the reinforcing plate having a contact portion and an arm portion, and the second piezoelectric element that undergoes extension and contraction by application of an AC voltage are laminated in this order, it is possible to obtain great driving force and a high drive speed by applying a low voltage to the vibrating element. Further, since the vibrating element drives using the extension and contraction of the in-plan direction thereof, it is possible to heighten (enhance) drive efficiency extremely.

In the operating apparatus of the present invention, it is preferable that the contacted element is fixedly provided on the frame.

Further, in the operating apparatus of the present invention, it is preferable that the vibrating element has a thin plate-shaped structure, and the contacted element and the vibrating element are provided in a substantially same plane.

In this invention, since the contacted element and the vibrating element are arranged in the substantially same plane, it is possible to constitute the drive mechanism of the driven element in one plane. In particular, in the case where the vibrating element has a plane structure, it is possible to make the entire apparatus thinner because the drive mechanism can be made further thinner.

In the operating apparatus of the present invention, it is preferable that the driven element has a side surface and the frame has an inner wall surface which is opposite to the side surface of the driven element through a gap therebetween, and the contacted element and the vibrating element are arranged within the gap.

According to this invention, it is possible to form the drive mechanism of the driven element the gap between the contacted element and the frame. This makes it possible to minimize a width of the operating apparatus.

In the operating apparatus of the present invention, it is preferable that the driven element has a bottom portion, and the vibrating element is provided on the bottom portion of the driven element.

In this invention, since the vibrating element is provided on (under) the bottom portion of the driven element, it is possible to minimize the width of the driven element when viewed from a top of the operating apparatus.

In the operating apparatus of the present invention, it is preferable that the vibrating element is provided in an area in which the driven element rotates (i.e., a rotative excursion area).

In this invention, since the vibrating element does not protrude from the rotative excursion area of the driven element, it is possible to make the operating apparatus smaller and thinner than the case where the drive unit is provided at the outside of the operating apparatus.

In the operating apparatus of the present invention, it is preferable that the contacted element forms a part of the frame.

It is preferable that the operating apparatus of the present invention further comprises (pushing) means for pushing one of the contacted element and the vibrating element toward the other.

This makes it possible to obtain great driving force, and to rotate the driven element surely.

In the operating apparatus of the present invention, it is preferable that the contacted element is a protruding portion provided on the inner wall surface of the frame.

In other embodiment of the present invention, the present invention is directed to an operating apparatus. The operating apparatus comprises:
a driven element on which a contacted element is rotatably provided;

a frame which rotatably supports the driven element;
a vibrating element which includes a first piezoelectric element that undergoes extension and contraction by application of an AC voltage, a reinforcing plate having a contact portion and an arm portion, and a second piezoelectric element that undergoes extension and contraction by application of an AC voltage, the first piezoelectric element, the reinforcing plate and the second piezoelectric element being laminated in this order, and the vibrating element being fixedly mounted on the driven element in a state where the contact portion abuts on the contacted element; and
a decelerating mechanism provided between the contacted element and the frame;
wherein the vibrating element transmits power to the driven element via the contacted element and the decelerating mechanism to rotate the driven element together with the vibrating element.

This makes it possible to drive the driven element with great torque.

It is preferable that the driven element is an imaging device having an optical system.

In the operating apparatus of the present invention, it is possible to control posture of the driven element with a minute amount of change by means of the vibrating element and a conducting device. Therefore, the operating apparatus is suitable in particular for an electro-optic instrument that requires fine adjustment for focus or the like on imaging, for example.

It is preferable that the driven element is a device for detecting sound.

In the operating apparatus of the present invention, it is possible to arbitrarily change a direction for detecting sound (acoustic wave) by means of the drive mechanism of the driven element. Therefore, the operating apparatus is suitable in particular for a sound collector that adopts a directional microphone or the like as the device for detecting sound.

It is preferable that the driven element is a device for adjusting the center of gravity (the device having a weight).

Since the drive mechanism of the driven element is constructed from a thin plate-shaped vibrating element in the operating apparatus of the present invention, it is possible to make the entire apparatus smaller and thinner. Therefore, the operating apparatus is suitable for a mechanism for moving the center of gravity that is utilized for posture control of a minute flying object.

It is preferable that the driven element is a radio-wave detecting device having a portion for receiving radio waves.

In the operating apparatus of the present invention, it is possible to arbitrarily change a direction for detecting radio waves by means of the drive mechanism of the driven element. Therefore, the operating apparatus is suitable in particular for a device for detecting a particular-direction radio wave.

In another aspect of the present invention, the present invention is directed to an electric instrument. The electric instrument has an operating apparatus. The operating apparatus comprises:
a driven element;
a frame which rotatably supports the driven element;
a contacted element which is stationary with respect to the frame; and
a vibrating element which includes a first piezoelectric element that undergoes extension and contraction by application of an AC voltage, a reinforcing plate having a contact portion and an arm portion, and a second piezoelectric element that undergoes extension and contraction by application of an AC voltage, the first piezoelectric element, the reinforcing plate and the second piezoelectric element being laminated in this order, and the vibrating element being fixedly mounted on the driven element in a state where the contact portion abuts on the contacted element;
wherein the vibrating element receives reaction force from the contacted element when the vibrating element vibrates so that the driven element is rotated together with the vibrating element by means of the reaction force.

In another embodiment of the present invention, an electric instrument is provided with an operating apparatus. The operating apparatus comprises:
a driven element on which a contacted element is rotatably provided;
a frame which rotatably supports the driven element;
a vibrating element which includes a first piezoelectric element that undergoes extension and contraction by application of an AC voltage, a reinforcing plate having a contact portion and an arm portion, and a second piezoelectric element that undergoes extension and contraction by application of an AC voltage, the first piezoelectric element, the reinforcing plate and the second piezoelectric element being laminated in this order, and the vibrating element being fixedly mounted on the driven element in a state where the contact portion abuts on the contacted element; and
a decelerating mechanism provided between the contacted element and the frame;
wherein the vibrating element transmits power to the driven element via the contacted element and the decelerating mechanism to rotate the driven element together with the vibrating element.

According to these electric instruments, it is possible to obtain effects similar to that of the operating apparatuses mentioned above.

BRIEF DESCRIPTION OF THE DRAWINGS

The preferred embodiments of an ultrasonic motor, an operating apparatus, an optical apparatus and electric instrument are described below with reference to the appended drawings.

PREFERRED EMBODIMENTS OF THE INVENTION

The preferred embodiments of an operating apparatus and electric instrument of the present invention will be described below with reference to the appended drawings. In this regard, it should be noted that the embodiments (disclosure) are to be considered as an exemplification, and therefore this structure should not be intended to limit the present invention to the specific embodiments illustrated. Further, components of the embodiments described later include ones that one skilled in the art could replace readily or substantial identities thereof.

(First Embodiment)

Figure 1:
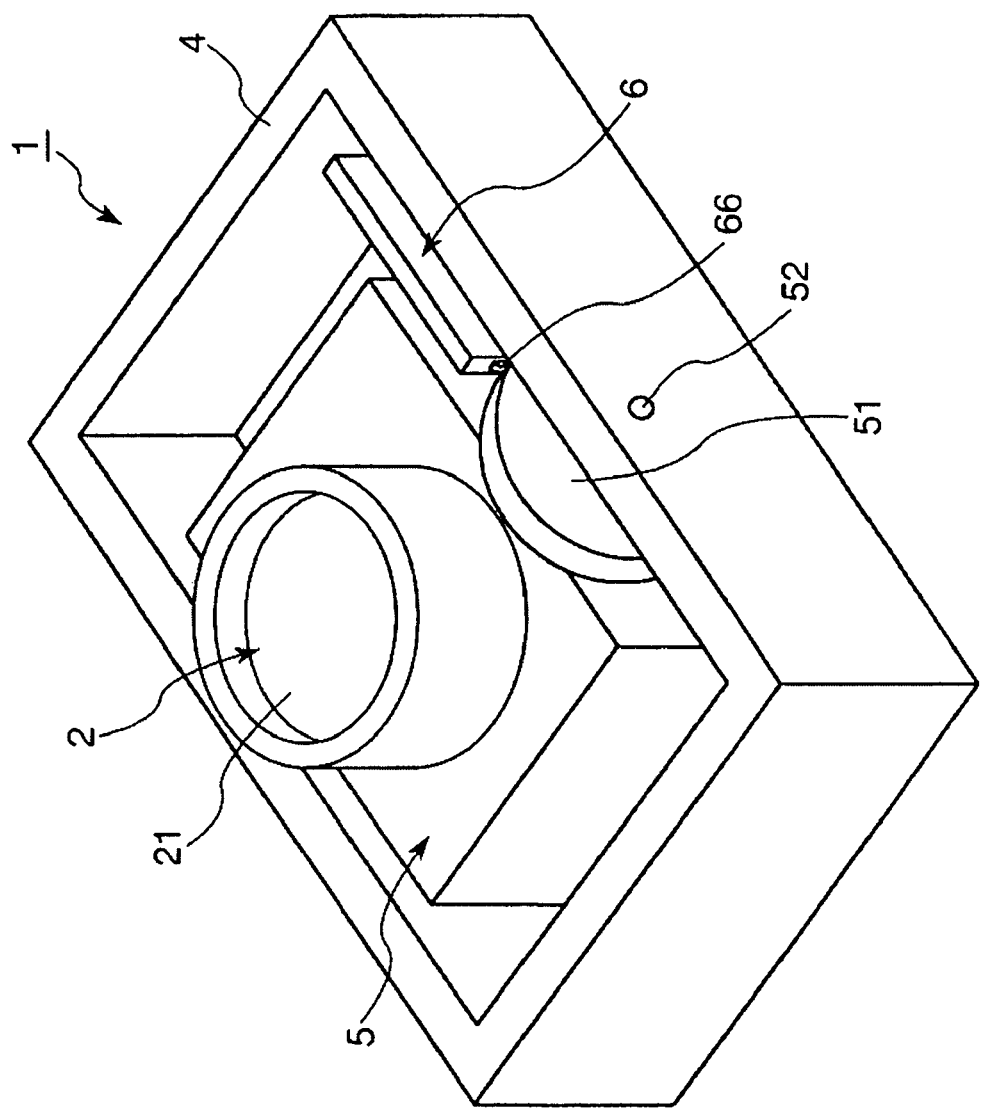
FIG. 1 is a perspective view illustrating an operating apparatus in a first embodiment according to the present invention.
Figure 2:
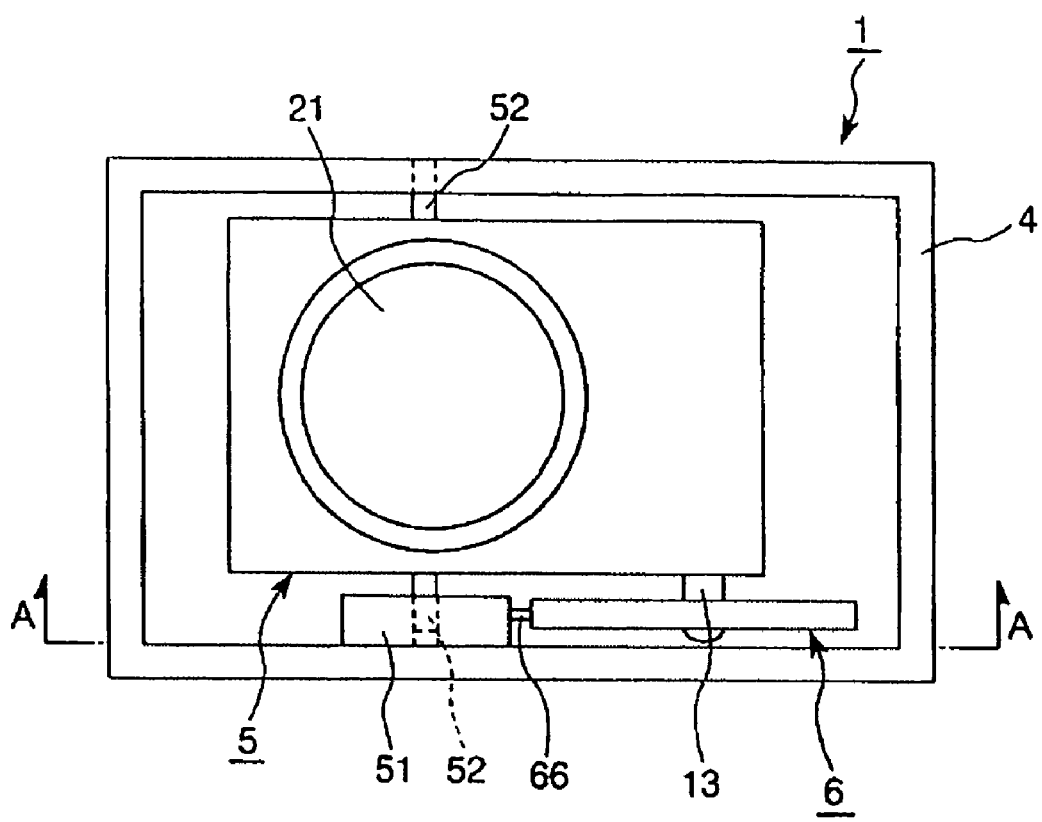
FIG. 2 is a plan view illustrating the operating apparatus shown in FIG. 1.
Figure 3:
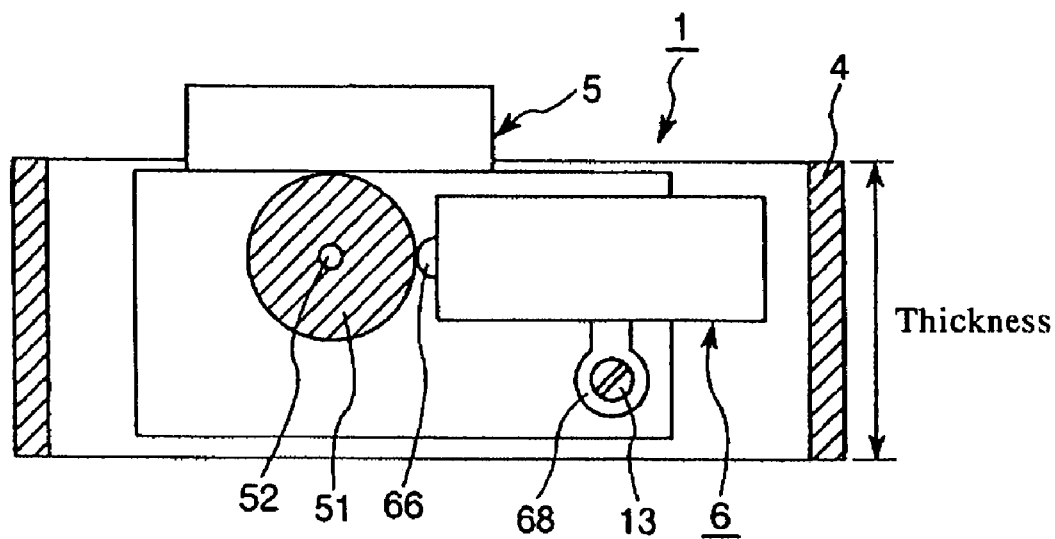
FIG. 3 is a cross-sectional view taken along line B—B of the operating apparatus shown in FIG. 2.
Figure 4:
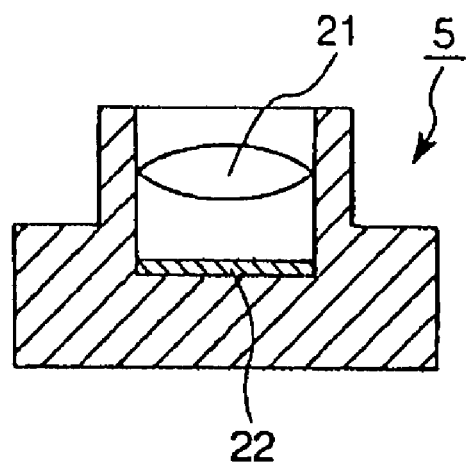
FIG. 4 is a cross-sectional view illustrating an optical system and a driven element shown in FIG. 1.

FIG. 1 is a perspective view illustrating an operating apparatus in a first embodiment according to the present invention. FIG. 2 is a plan view illustrating the operating apparatus shown in FIG. 1. FIG. 3 is a cross-sectional view taken along line B—B of the operating apparatus shown in FIG. 2. FIG. 4 is a cross-sectional view illustrating the optical system and the driven element shown in FIG. 1. The operating apparatus 1 includes an optical system 2, a frame 4, a driven element 5, and a vibrating element 6. The optical system 2 includes a lens 21 and an imaging element (solid imaging element) 22, and serves as an imaging section of the operating apparatus 1. In this regard, the lens 21 may be a pinhole, for example. Further, the imaging element 22 is an image sensor or a charge-coupled device (CCD), for example. The frame 4 is formed from a box frame-shaped member. The operating apparatus 1 is fixedly mounted at a predetermined position of a cradle, a wall surface or the like (not shown in the drawings) through the frame 4. The frame 4 has a cylinder-shaped contacted element (rotor) 51 on an inner wall surface thereof. The contacted element 51 is fixed on the inner surface of the frame 4.

The driven element 5 has a box-type structure (box portion), and a cylinder portion is mounted on a top surface of the box portion (see FIGS. 1–4). The lens 21 is arranged in the cylinder portion, and the imaging element 22 is arranged in the box portion. Thus, the driven element 5 serves as an imaging means of the operating apparatus 1 (imaging unit). The driven element 5 is provided with shafts 52, 52 that respectively protrude from both side surfaces of the box portion. The driven element 5 is received inside the frame 4, and rotatably supported in the frame 4 through the shafts 52, 52. The shafts 52 constitute a rotative axis of the driven element 5. Further, as shown in FIG. 2, the end portion of one shaft 52 is inserted to the center of the contacted element 51 in the frame 4 to be supported by the contacted element 51. Thus, the contacted element 51 is positioned on the rotative axis of the driven element 5. In this regard, it should be noted that a shape of the driven element 5 is not limited to the shape thereof in the first embodiment, and it may be changed its design in response to the function of the operating apparatus 1. Moreover, the driven element 5 has an IC chip for data processing (not shown in the drawings) within the box portion.

The vibrating element 6 has a substantially rectangular and thin plate-shaped structure, and is provided with an arm portion 68 at a side portion of one long side thereof. The vibrating element 6 is arranged at a state where it is floating in the air on one side circumferential surface of the driven element 5 so that a major surface of the vibrating element 6 is substantially parallel to the side circumferential surface of the driven element 5 (see FIG. 2). In this case, the contacted element 51 and the vibrating element 6 are arranged in a substantially same plane. Further, the vibrating element 6 is fixedly provided on the side circumferential surface of the driven element 5 via the arm portion 68 and a bolt 13. The vibrating element 6 has a contact portion 66 on a side portion of one short side thereof. The contact portion 66 of the vibrating element 6 is in contact with a circumferential surface of the contacted element 51. In other words, a tip of the contact portion 66 of the vibrating element 6 abuts on the circumferential surface of the contacted element 51 in a radial direction thereof. At this time, the contact portion 66 of the vibrating element 6 resiliently biases toward the side surface of the contacted element 51 by means of elasticity of the arm portion 68 and the bolt 13. This makes it possible to obtain enough frictional force at the contact surface between the contact portion 66 and the contacted element 51. Therefore, vibration of the vibrating element 6 is surely transmitted to the contacted element 51. The vibrating element 6 is connected to an outer conducting circuit (not shown, but described later) for controlling the drive of the vibrating element 6. The vibrating element 6 and the conducting circuit serve as an ultrasonic motor that drives the operating apparatus 1. The constitution and functions of the vibrating element 6 will be described later in detail.

Figure 5:
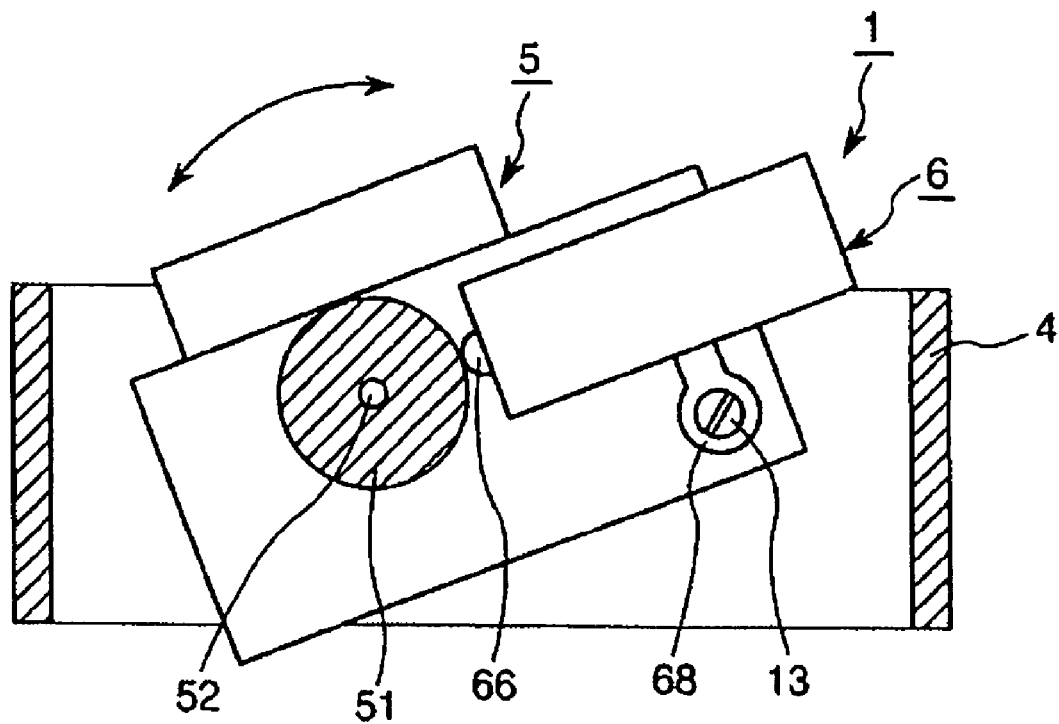
FIG. 5 is an explanatory drawing showing an action of the operating apparatus in the first embodiment.

FIG. 5 is an explanatory drawing showing an action of the operating apparatus in the first embodiment. In this operating apparatus 1, the vibrating element 6 undergoes expansion and contraction at a high speed by application of a high-frequency alternating current from the outer conducting circuit to repeatedly strike the contacted element 51 on the circumferential surface at a high speed by the contact portion 66. Since the contacted element 51 is fixed on the frame 4, the vibrating element 6 itself is displaced by means of reactive force thereof based on frictional contact between the contact portion 66 and the contacted element 51. Since the vibrating element 6 is fixed on the driven element 5, the driven element 5 rotatively displaces around the shaft 52 together with the vibrating element 6. Thus, an imaging direction of the optical system 2 is changed toward a rotative direction of the driven element 5. In this way, since the direction of the optical system 2 can be arbitrarily changed by the drive of the vibrating element 6 in this operating apparatus 1, it is suitable in particular for an electric instrument that requires a change of the imaging direction thereof. The rotative direction of the driven element 5 can be arbitrarily changed by selecting one of input patterns of the alternating current to the vibrating element 6. Thus, it is possible to rotate the driven element 6 in both forward and reverse directions. In this regard, the drive pattern of the vibrating element 6 will be described later.

According to the operating apparatus 1, since the thin plate-shaped vibrating element 6 is utilized as a drive unit of the driven element 5, it is possible to make the entire apparatus thinner and smaller. Further, since the vibrating element 6 has a plate-shaped structure, it is possible to constitute the drive unit of the driven element 5 (i.e., the vibrating element 6) with a thin and planar structure. This makes it possible to make the driven element 5 smaller on the constitution where the drive unit is provided at a side of the driven element 5. Further, such a planar structure makes it possible to arrange the drive unit at a small gap between the inner wall surface of the frame 4 and the driven element 5 (see FIGS. 1–3).

In the first embodiment, the driven element 5 of the operating apparatus 1 is an imaging device (imaging unit) having an optical system 2 (imaging element 22). Namely, the operating apparatus 1 is an imaging apparatus having the optical system 2 (imaging element 22), and may be applied to an electro-optic instrument such as a monitoring camera, a door camera (camera for monitoring a door), a camera in a mobile phone (cellular phone), a videophone (TV phone), a personal computer with a camera, and the like. In particular, the operating apparatus 1 has an advantage that the posture of the driven element 5 can be controlled with a minute amount of change by means of the vibrating element 6 and a conducting device 20 (described later). Therefore, the operating apparatus 1 is suitable in particular for an electro-optic instrument that requires fine adjustment for focus or the like on imaging, for example. Further, since the operating apparatus 1 utilizes the thin plate-shaped vibrating element 6 as a drive unit, it is possible to make the entire apparatus thinner and smaller. Thus, for example, if the operating apparatus 1 is applied to a monitoring camera, it is possible to enhance flexibility (degree of freedom) of the installing location thereof. In this case, since such a monitoring camera is smaller than a conventional large monitoring camera, it may be obscure. Thus, it is possible to enhance effects of monitoring against crimes carried out away from the installing locations of monitoring cameras. Moreover, in the operating apparatus 1, an imaging direction thereof can be changed by rotating the driven element 5 in a normal or reverse direction. Thus, for example, if the operating apparatus 1 is applied to a door camera, it is possible to take an image of a direction other than the direction toward the front of the door, and to take an image of a small child or the like.

Further, in the first embodiment, the driven element 5 may be changed to one other than the imaging device (imaging unit).

For example, in the first embodiment, the driven element 5 of the operating apparatus 1 may be changed to a device for detecting sound waves (means for collecting sound waves) such as a microphone or the like. Namely, the operating apparatus 1 may be constructed as a sound collector with the device for detecting sound. In particular, the operating apparatus 1 has an advantage that a detecting direction of sound can be arbitrarily changed by means of the drive mechanism of the driven element 5. Therefore, the operating apparatus 1 is suitable in particular for a sound collector that adopts a directional microphone or the like as the device for detecting sound. Further, since the operating apparatus 1 can control the posture of the driven element 5 with a minute amount of change by means of the vibrating element 6 and the conducting device 20 (described later), it is possible to carry out detecting sound more suitably.

Moreover, in the first embodiment, the driven element 5 of the operating apparatus 1 may be changed to a device for adjusting the center of gravity with a weight. Namely, the operating apparatus 1 may be constructed as a mechanism for moving the center of gravity having the device for adjusting the center of gravity. In particular, since the operating apparatus 1 utilizes the thin plate-shaped vibrating element 6 as a drive mechanism for the driven element 5, it is possible to make the entire apparatus thinner and smaller. Therefore, the operating apparatus 1 is suitable for a mechanism for moving the center of gravity that is utilized for posture control of a minute flying object. Further, since the operating apparatus 1 can control the posture of the driven element 5 with a minute amount of change by means of the vibrating element 6 and the conducting device 20 (described later), it is possible to carry out the posture control of the minute flying object more accurately.

Furthermore, in the first embodiment, the driven element 5 of the operating apparatus 1 may be changed to a radio-wave detecting device having a portion for receiving radio waves such as a parabolic antenna, a CS (Communication Satellite) antenna, GPS (Global Positioning System) antenna or the like. Namely, the operating apparatus 1 may be constructed as a radio-wave detecting apparatus with the radio-wave detecting device. In particular, the operating apparatus 1 has an advantage that a detecting direction of radio waves can be arbitrarily changed by means of a drive mechanism of the driven element 5. Therefore, the operating apparatus 1 is suitable in particular for a device for detecting a particular-direction radio wave. Further, since the operating apparatus 1 can control the posture of the driven element 5 with a minute amount of change by means of the vibrating element 6 and the conducting device 20 (described later), it is possible to carry out detecting radio waves more suitably.

Figure 6:
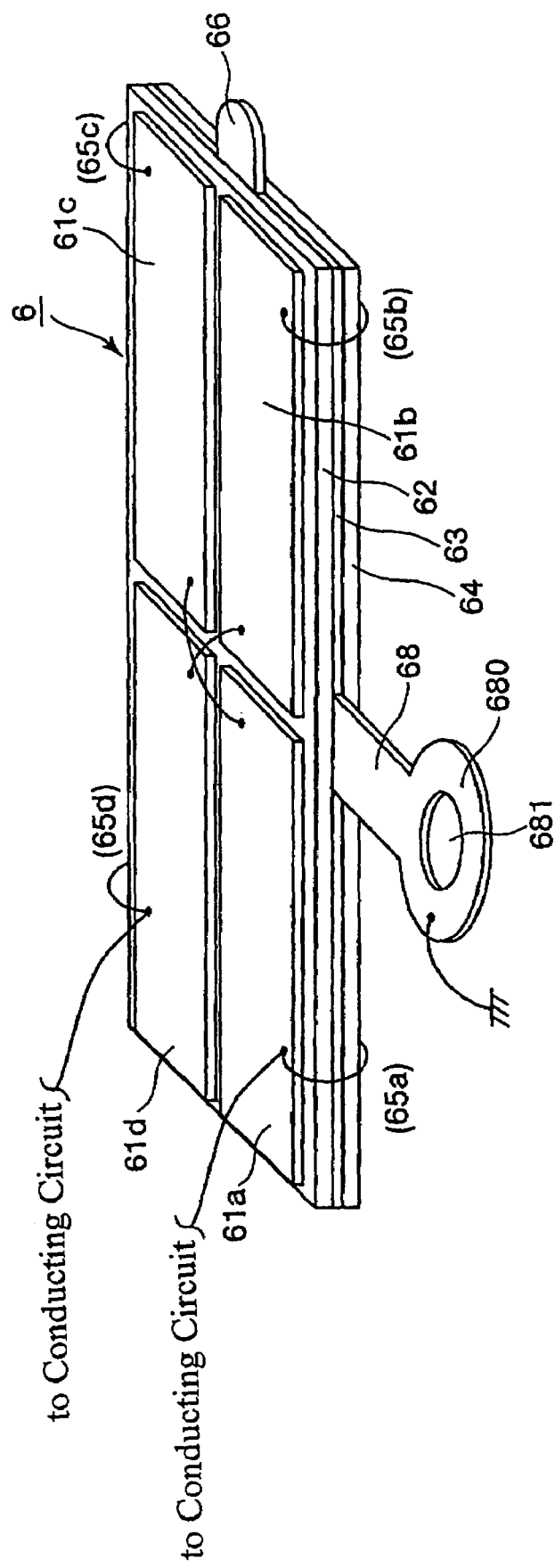
FIG. 6 is a perspective view of the vibrating element shown in FIG. 1.
Figure 7:
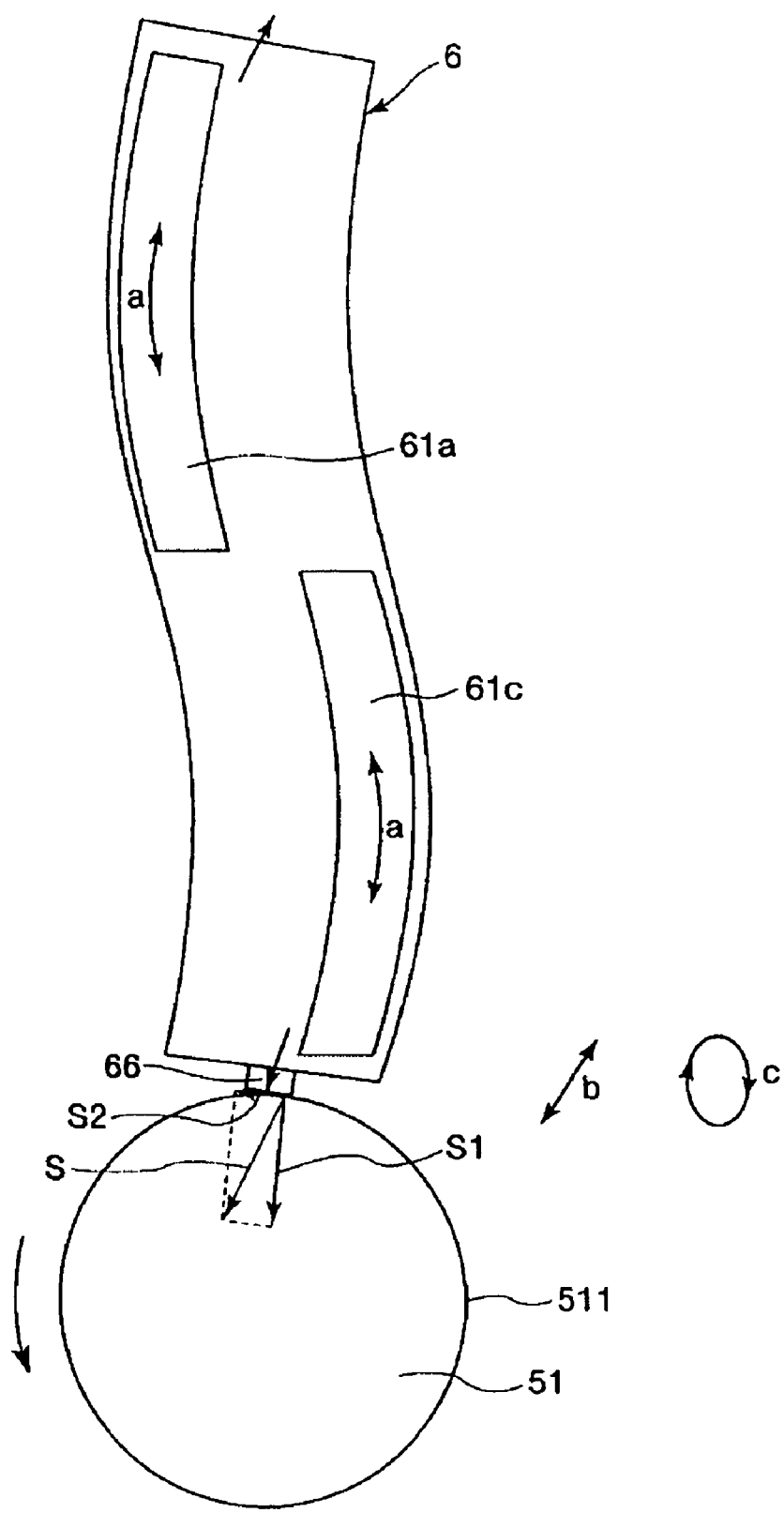
FIG. 7 is an explanatory drawing showing an action of the vibrating element shown in FIG. 6.
Figure 8:
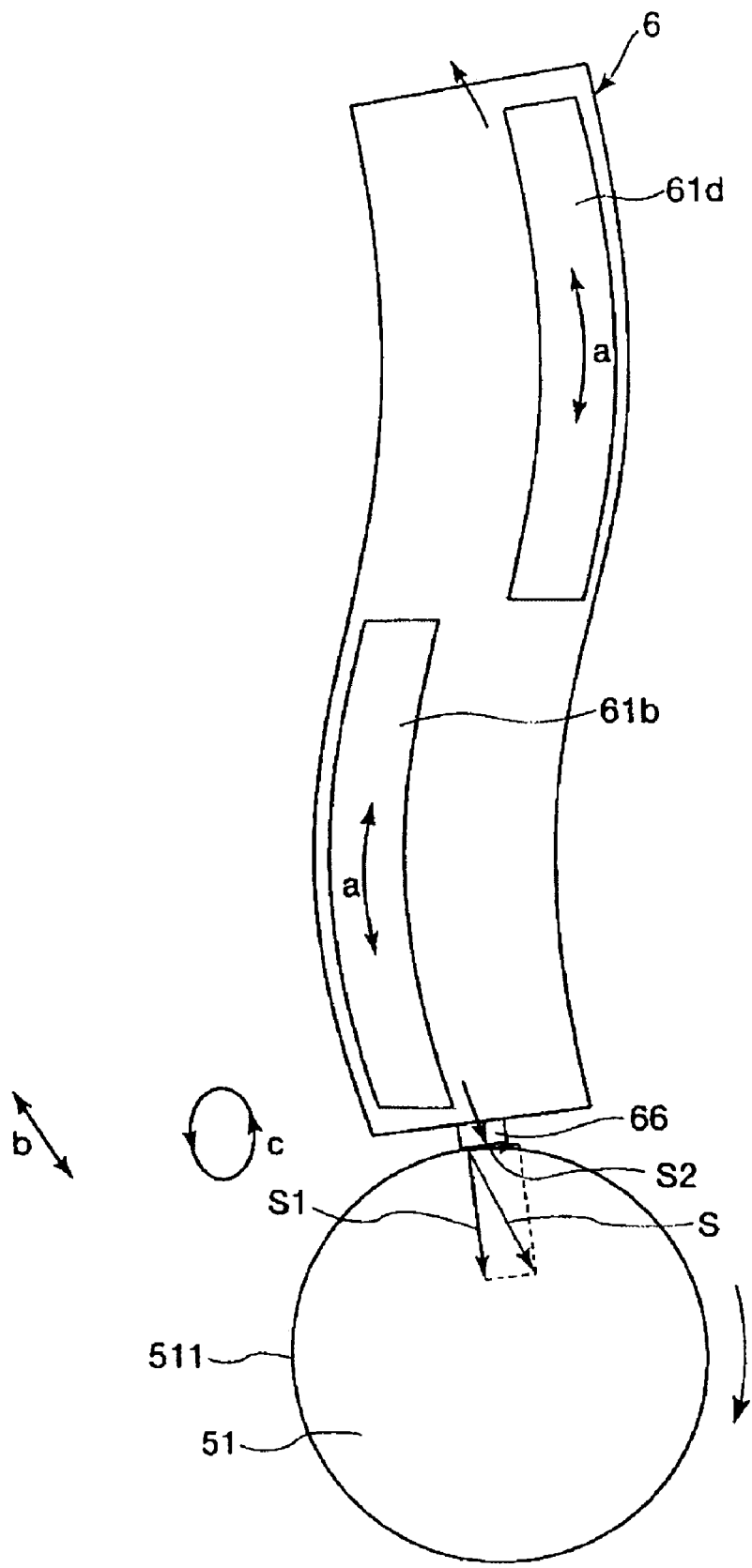
FIG. 8 is an explanatory drawing showing an action of the vibrating element shown in FIG. 6.

FIG. 6 is a perspective view of the vibrating element shown in FIG. 1. FIGS. 7 and 8 are explanatory drawings each showing an action of the vibrating element shown in FIG. 6. The vibrating element 6 is constructed by laminating a piezoelectric element 62, a single reinforcing plate 63, and a piezoelectric element 64 in this order so that the reinforcing plate 63 is arranged centrally and interposes between the pair of piezoelectric elements 62, 64. Further, in the vibrating element 6, electrodes 61a–61d and electrodes 65a–65d (These electrodes 65a–65d are not shown in FIG. 7, but reference numerals of these electrodes are merely designated using parentheses.) are arranged at predetermined positions on the both faces of the vibrating element 6.

The reinforcing plate 63 has a substantially rectangular plate-shaped structure, and a thickness of the reinforcing plate 63 is thinner than that of the each of the piezoelectric elements 62, 64. Thus, there is an advantage that the vibrating element 6 can undergo vibration with high efficiency. Material to constitute the reinforcing plate 63 is not especially limited. However, the material is preferably a kind of metal material such as stainless steel, aluminum or aluminum alloy, titan or titan alloy, and copper or copper system alloy or the like. The reinforcing plate 63 has a function to reinforce the entire vibrating element 6, thereby preventing the vibrating element 6 from being injured due to over-vibration of the vibrating element 6, external force or the like. Further, the reinforcing element 63 has a function as a common electrode for the piezoelectric elements 62, 64 to conduct these piezoelectric elements.

The piezoelectric elements 62, 64 respectively have substantially rectangular plate-shaped structures same as that of the reinforcing plate 63. The piezoelectric elements 62, 64 face each other so as to sandwich the reinforcing plate 63 from the both faces thereof, and are laminated so as to coordinate with these plan positions against the reinforcing plate 63. Further, the piezoelectric elements 62, 64 are fixed to the reinforcing plate 63 to integrate into a single structure. This makes it possible to improve strength of the vibrating element 6. The piezoelectric elements 62, 64 consist of material that can undergo expansion and contraction by applying an AC voltage to the elements 62, 64. Material to constitute the piezoelectric elements 62, 64 is not especially limited. For example, it is possible to use various kinds of materials such as plumbum zirconate titanate (PZT), quartz crystal, lithium niobate, barium titanate, plumbum titanate, plumbum metaniobate, polyvinylidene fluoride, zinc plumbum niobate, scandium plumbum niobate, and the like.

The electrodes 61a–61d and 65a–65d are made from rectangle-shaped metal members, and arranged at predetermined positions on the piezoelectric elements 62, 64, respectively. In this case, these electrodes have a length substantially half of the long side of the piezoelectric elements, and are arranged so that two of the electrodes are aligned in their longitudinal direction along the end portion of the long side on each of the piezoelectric elements 62, 64. Thus, the electrodes 61a–61d, 65a–65d are respectively arranged on the piezoelectric elements 62, 64, and respectively positioned symmetrical to both centerlines of the longitudinal and width directions on the piezoelectric elements 62, 64 (see FIG. 6).

In this regard, the electrodes 61a–61d and 65a–65d are respectively arranged on the both faces of the vibrating element 6 so as to face each other. Reference numerals designated using parentheses in FIG. 6 indicate the electrodes 65a–65d facing to the electrodes 61a–61d against the vibrating element 6 each other. The electrodes 61a, 61c lying at one diagonal line in a front face on the piezoelectric element 62 are electrically connected to the electrodes 65a, 65c lying at a corresponding diagonal line in the back face on the piezoelectric element 64, and these electrodes 61a, 61c, 65a, and 65c are connected to the outer conducting circuit. In a same way, the electrodes 61b, 61d lying at the other diagonal line in the front face on the piezoelectric element 62 are electrically connected to the electrode 65b, 65d lying at a corresponding diagonal line in the back face on the piezoelectric element 64, and these electrodes 61b, 61d, 65b, and 65d are connected to the outer conducting circuit. In this way, the electrodes 61a–61d and 65a–65d are conducted as these combinations by application of the voltage from the conducting circuit. In this regard, to conduct the electrodes in either combination can be arbitrarily selected based on the constitution of the conducting circuit described later.

Further, the vibrating element 6 has the contact portion 66 at the center of one short side, i.e., the center of the tip portion in the longitudinal direction. The contact portion 66 is integrally formed from a single member with respect to the reinforcing plate (vibrating plate) 63. Namely, in this embodiment, the contact portion 66 is formed as a protruding portion that protrudes from a part of the short side of the vibrating element 6. Thus, there is an advantage that the contact portion 66 can be placed on the vibrating element 6 tightly. In particular, the contact portion 66 repeatedly strikes on the contacted element 51 with high pushing force (suppress strength) at a high speed by means of the vibration of the vibrating element 6 during the operation of the operating apparatus 1. Therefore, this structure makes it possible to ruggedize (improve endurance of) the contact portion 66. The contact portion 66 has a semicircular (arched) tip portion (see FIG. 6). The contact portion 66 can stably come into frictional contact with the side surface of the contacted element 51 in comparison with the case where the contact portion 66 has a square-shaped tip portion. Thus, there is an advantage that the pushing force from the vibrating element 6 can be transmitted to the contacted element 51 surely in the case where the direction of application of the vibrating element 6 is out of alignment more or less.

Further, the vibrating element 6 has the arm portion 68 protruding substantially perpendicular to the long side thereof at the center of one long side, i.e., the center of the side surface in the longitudinal direction. The arm portion 68 is integrally formed from a single member to the reinforcing plate 63. Thus, there is an advantage that the arm portion 68 can be placed on the vibrating element 6 tightly. The vibrating element 6 is fixedly arranged to the frame 4 by means of the bolt 13 so that the bolt 13 is inserted through the aperture 681 provided on the tip portion of the arm portion 68. The vibrating element 6 is provided (supported) in a floating condition in the air with respect to an inner wall surface of the frame 4 by means of the arm portion 68 (see FIG. 2). Since there is no friction between the vibrating element 6 and the frame 4 in this structure, it is hard to restrict the vibration of the vibrating element 6, whereby there is an advantage that the vibrating element 6 can realize unlimited vibration. Further, since the reinforcing plate 63 is made from metal material, the arm portion 68 has elasticity. The vibrating element 6 is supported by means of the arm portion 68 at the condition where the contact portion 66 is biased to the side surface of the contacted element 51 due to the elasticity. Moreover, the reinforcing plate 63 of the vibrating element 6 is connected to ground via the arm portion 68.

Here, an arm portion 68 is arranged at a position of a vibrational node of the vibrating element 6 on the side surface of the vibrating element 6. The point of the vibrational node may be appropriately determined within an obvious scope of one skilled in the art using known methods such as vibration analysis. For example, in a case where the electrodes 61*a*–61*d* and the electrodes 65*a*–65*d* are symmetrically arranged in the longitudinal direction and the width direction of the vibrating element 6 as the operating apparatus 1, the vibrational node may be located at substantial center of the longitudinal direction of the vibrating element 6. Therefore, the arm portion 68 is provided at the substantial center of the long side of the vibrating element 6 in the operating apparatus 1. In this case, since the arm portion 68 does not prevent the vibration of the vibrating element 6, it is possible to reduce vibration leakage (extinction of the vibrational energy) from the arm portion 68 to an external portion. This makes it possible to efficiently rotate (drive) the driven element 5.

FIGS. 7 and 8 are explanatory drawings each showing an action of the vibrating element shown in FIG. 6. FIG. 7 shows a case where the contacted element 51 rotates in a counterclockwise direction in the drawing (the driven element 5 rotates in a clockwise direction in this embodiment), while FIG. 8 shows a case where the contacted element 51 rotates in a direction reverse to the direction shown in FIG. 7 (i.e., in a clockwise direction) (the driven element 5 rotates in a counterclockwise direction in this embodiment).

In a condition shown in FIG. 7, first, an AC voltage is applied to the vibrating element 6 from an outer conducting circuit (not shown). Then, the electrodes 61*a*, 61*c*, 65*a*, and 65*c* lying at one diagonal line on both faces of the vibrating element 6 are conducted, whereby the AC voltage is applied between these electrodes and the reinforcing plate 63. The portions where these electrodes are provided on the piezoelectric elements 62, 64 repeatedly undergo expansion and contraction at a high speed. In this case, as shown in FIG. 8, the portions corresponding to the electrodes 61*a*, 61*c*, 65*a*, and 65*c* respectively repeatedly undergo extension and contraction in a direction represented by arrows a. Thus, as a whole, the vibrating element 6 undergoes micro vibration bending as a substantial S shape. By this vibration, the contact portion 66 of the vibrating element 6 undergoes vibration (reciprocates) in a slanting direction represented by an arrow b, or the contact portion 66 is displaced along a substantially elliptic shape, i.e., vibrates (moves) in an elliptical manner as represented by an arrow c. The contacted element 51 receives frictional force (or pushing force) from the contact portion 66 by this movement. In other words, great frictional force is provided between the contact portion 66 and the outer circumferential surface 511 by a component S1 corresponding to the radial direction of an vibrating displacement S of the contact portion 66 (displacement in a radial direction of the contacted element 51), and further turning force generated in the counterclockwise direction in FIG. 7 is provided to the contacted element 51 by a component S2 corresponding to circumferential direction of the vibrating displacement S (displacement in a circumferential direction of the contacted element 51). The contacted element 51 rotates in the counterclockwise direction (namely, the driven element 5 rotates in the clockwise direction in this embodiment) by repeatedly receiving the pushing force from the contact portion 66 at a high speed.

On the other hand, in a condition shown in FIG. 8, the electrodes 61*b*, 61*d*, 65*b*, and 65*d* are conducted. These electrodes are conducted symmetrical to the condition shown in FIG. 7. Then, the vibrating element 6 undergoes vibration symmetrical to the condition shown in FIG. 7, whereby the contacted element 51 rotates in the clockwise direction in the drawing (namely, the driven element 5 rotates in the counterclockwise direction in this embodiment) by receiving the pushing force from the contact portion 66. In this way, in the operating apparatus 1, there is an advantage that the contacted element 51 (the driven element 5 in case of this embodiment) can rotate (be driven) in either the clockwise direction or the counterclockwise direction by selecting a conducting pattern. In this regard, in the condition shown in FIG. 8, the electrodes 61*a*, 61*c*, 65*a*, and 65*c* to which a power is not applied (not activated) constitute vibration detecting means for detecting the vibration of the vibrating element 6.

Figure 9:
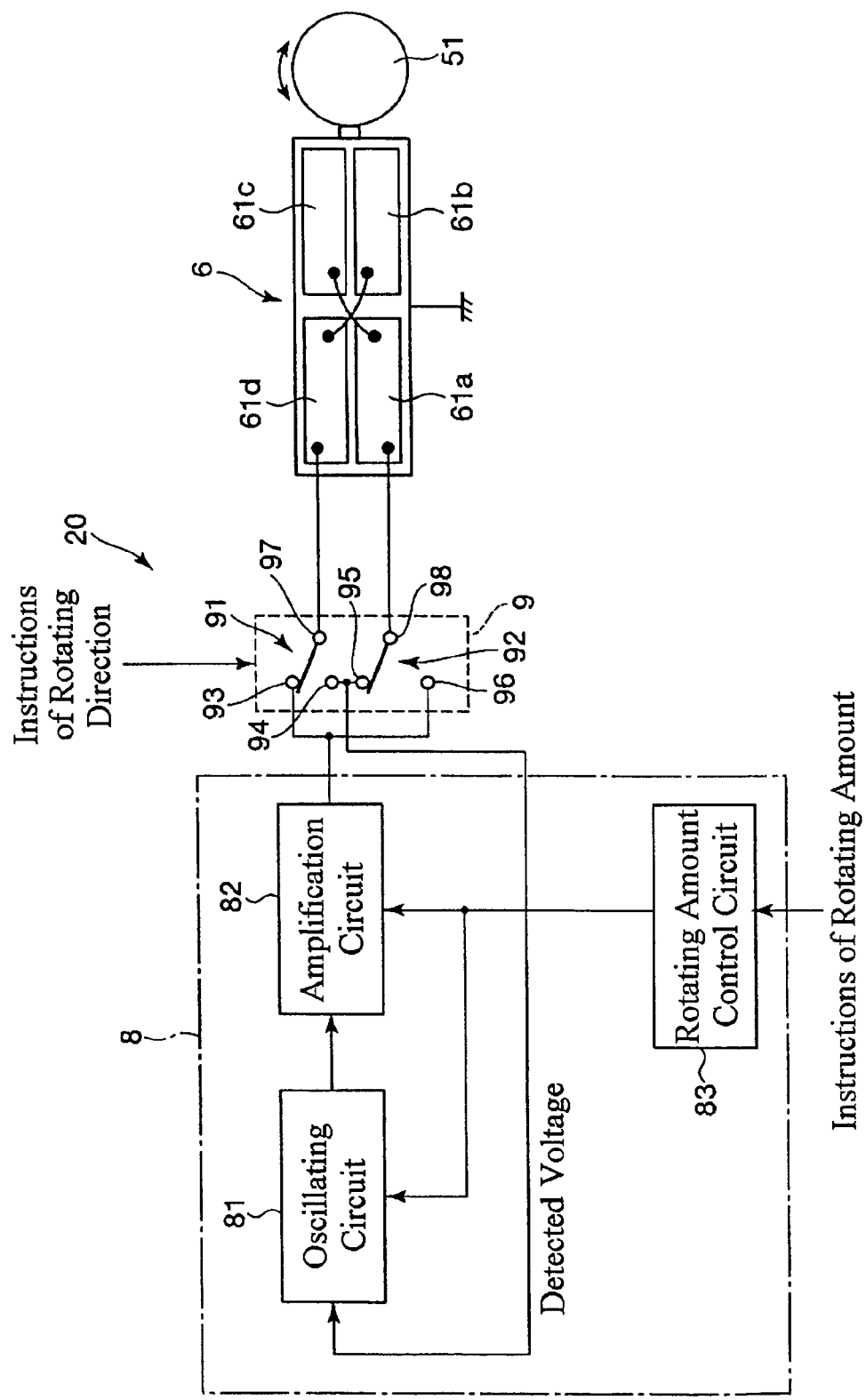
FIG. 9 is a block diagram illustrating a conducting circuit of the vibrating element.

FIG. 9 is a block diagram illustrating a conducting circuit of the vibrating element described in FIGS. 1–8. As shown in FIG. 9, the conducting circuit 20 is provided with a drive circuit 8 and a switch 9. The conducting circuit 20 applies an AC voltage to the vibrating element 6 to drive the vibrating element 6. Further, the conducting circuit 20 has a function for switching vibrating modes of the vibrating element 6 by selecting the conducting pattern, and a function for feedback controlling the vibration of the vibrating element 6 by detecting the voltage value of the vibrating element 6.

The drive circuit 8 includes an oscillating circuit 81, an amplification circuit 82, and a rotating amount control circuit 83. In the drive circuit 8, the oscillating circuit 81 generates an AC voltage to be outputted to the amplification circuit 82, and the amplification circuit 82 amplifies the AC voltage to apply the amplified AC voltage to the vibrating element 6. The rotating amount control circuit 83 controls both the oscillating circuit 81 and the amplification circuit 82, and adjusts the AC voltage applied to the vibrating element 6 so that the rotating amount of the driven element 5 becomes a target value instructed.

The switch 9 switches between conducting electrodes to which the AC voltage is applied and electrodes to be used as vibration detecting means, thereby switching a rotative direction of the contacted element 51 (i.e., a rotative direction of the driven element 5). The switch 9 has two switching sections 91, 92 that operate simultaneously with each other. The electrode 61*d* of the vibrating element 6 is connected to a terminal 97 of the switching section 91. The electrode 61*a* is connected to a terminal 98 of the switching section 92. Further, a terminal 93 of the switching section 91 and a terminal 96 of the switching section 92, each is connected to an output side of the amplification circuit 82 of the drive circuit 8, and an AC voltage from the amplification circuit 82 is applied to the vibrating element 6 via each of the terminals 93, 96. Moreover, a terminal 94 of the switching section 91 and a terminal 95 of the switching section 92, each is connected to an input side of the oscillating circuit 81 of the drive circuit 8.

Next, an operation of the operating apparatus 1 will be described with reference to FIG. 10.

First, instructions regarding the rotative direction and the rotating amount (for example, rotation number, rotation angle, or the like) for the driven element 5 (and the vibrating element 6) are inputted to the rotating amount control circuit 83 in the conducting circuit 20 when the driven element 5 is driven (rotated). In a case of the instructions that the contacted element 51 is rotated in the counterclockwise direction in FIG. 9 (in a forward direction), i.e., in a case of the instructions that the driven element 5 rotates in the clockwise direction, the switch 9 is switched so that the terminal 94 of the switching portion 91 is connected to the terminal 97, and that the terminal 96 of the switching portion 92 is connected to the terminal 98. Thus, the output side of the amplification circuit 82 of the drive circuit 8 is conducted to the electrodes 61a, 61c, 65a, and 65c of the vibrating element 6. When an AC voltage is applied to the piezoelect 62, 64 of the vibrating element 6, the vibrating element 6 undergoes longitudinal vibration and bending vibration, whereby the contact portion 66 on the outer circumferential surface 511 of the contacted element 51 so that the contacted element 51 rotates in the counterclockwise direction in FIG. 9 (i.e., the driven element 5 rotates in the clockwise direction in this embodiment).

Further, in this condition, the electrodes 61b, 61d, 65b, and 65d of the vibrating element 6 are conducted to the input side of the oscillating circuit 81 of the drive circuit 8. These electrodes constitute detecting electrodes during driven of the vibrating element 6, which are used for detecting a voltage to be induced between the reinforcing plate 63 and each of the electrodes 61b, 61d, 65b, and 65d (i.e., induced voltage). Based on the detected voltage, the oscillating circuit 81 outputs an AC voltage having a frequency (resonant frequency) at which amplitude of the vibrating element 6 becomes maximum, i.e., the detected voltage becomes maximum. Thus, there is an advantage that the contacted element 51 (i.e., the driven element 5 in this embodiment) can be rotated efficiently. Further, the rotating amount control circuit 83 operates (controls) the oscillating circuit 81 and the amplification circuit 82 until the rotating amount of the driven element 5 becomes the target value instructed, thereby driving the vibrating element 6 to rotate the driven element 5.

On the other hand, in a case of the instructions that the contacted element 51 is rotated in a clockwise direction in FIG. 9 (in a reverse direction), i.e., in a case of the instructions that the driven element 5 rotates in the counterclockwise direction, the switch 9 is switched so that the terminal 93 of the switching portion 91 is connected to the terminal 97, and that the terminal 95 of the switching portion 92 is connected to the terminal 98. Thus, the output side of the amplification circuit 82 of the drive circuit 8 is conducted to the electrodes 61b, 61d, 65b, and 65d of the vibrating element 6. When an AC voltage is applied to the piezoelectric elements 62, 64 of the vibrating element 6, the vibrating element 6 undergoes longitudinal vibration and bending vibration, whereby the contact portion 66 strikes on the contacted element 51 so that the contacted element 51 rotates in the clockwise direction in FIG. 9 (i.e., the driven element 5 rotates in the counterclockwise direction). Further, in this condition, the electrodes 61a, 61c, 65a, and 65c of the vibrating element 6 are conducted to the input side of the oscillating circuit 81 of the drive circuit 8. These electrodes function as detecting electrodes during driven of the vibrating element 6. Explanation of following operations will be omitted, because the following operations are the same as the operations in the case of the instructions for rotating the driven element 5 in the clockwise direction.

According to the operating apparatus 1, since the vibrating element 6 has a thinner plate-shaped structure, it is possible to make the entire apparatus 1 thinner and to miniaturize the entire apparatus 1. In particular, in the electro-optic instrument field, since there are a great number of requests that such an apparatus is made thinner and miniaturized recently, one skilled in the art tends to spend a large amount of development costs on this point. Therefore, the operating apparatus 1 in which a drive member is constituted from the vibrating element 6 comes in very useful. Further, since the vibrating element 6 drives the contacted element 51 (the driven element 5) by means of the frictional force (pushing force), it is possible to obtain high drive torque and high efficiency in comparison with the motor driven by magnetic force. Therefore, there is an advantage that the contacted element 51 (the driven element 5) can be driven with enough force without a converting mechanism (decelerating mechanism).

Further, according to the operating apparatus 1, since electromagnetic noise of the vibrating element 6 is extremely smaller than that of the motor driven by the magnetic force, it is possible to reduce effects against peripheral equipments due to the electromagnetic noise. Moreover, since there is no need for a converting mechanism, it is possible to lower (reduce) energy loss. In addition, since the contacted element 51 (i.e., the driven element 5) is directly driven by the vibrating element 6 and therefore there is no need for a decelerating mechanism, it is possible to make the apparatus lighter and thinner, and to miniaturize the apparatus. Thus, since the structure of the apparatus can be simplified extremely and the apparatuses can be easily manufactured, there is an advantage the manufacturing cost can be reduced.

Furthermore, according to the operating apparatus 1, since in-plan vibration of the vibrating element 6 can be converted to rotation of the contacted element 51 (i.e., rotation of the driven element 5), it is possible to reduce energy loss caused by this conversion and to obtain high drive efficiency. Further, the contact portion 66 of the vibrating element 6 biases to the contacted element 51 with a frictional contact condition while the driven element 5 (or contacted element 51) is in a stopping state, it is possible to prevent the rotation of the driven element 5 (or the contacted element 51) and to hold the driven element 5 (the contacted element 51) at a stopping position stably. Moreover, since the driven element 5 (the contacted element 51) can be alternatively rotated in the forward and reverse directions using a signal vibrating element 6, a number of components of the operating apparatus 1 can be reduced in comparison with a case where two dedicated vibrating elements are respectively provided for the moving (driving) directions.

In this regard, the operating apparatus 1 in this embodiment is constructed so that the driven element 5 rotatively displaces (rotates) around one axis (i.e., the shaft 52), but the present invention is not limited to this structure. For example, the operating apparatus 1 may be constructed so that the driven element 5 rotatively displaces (rotates) around two axes whose directions are different from each other, in particular, around two axes that mutually cross at right angles. An operating apparatus 1 in each of embodiments described later may be constructed in the similar manner as in the first embodiment.

(Second Embodiment)

Next, a description will be given for a second embodiment of the operating apparatus 1.

Figure 10:
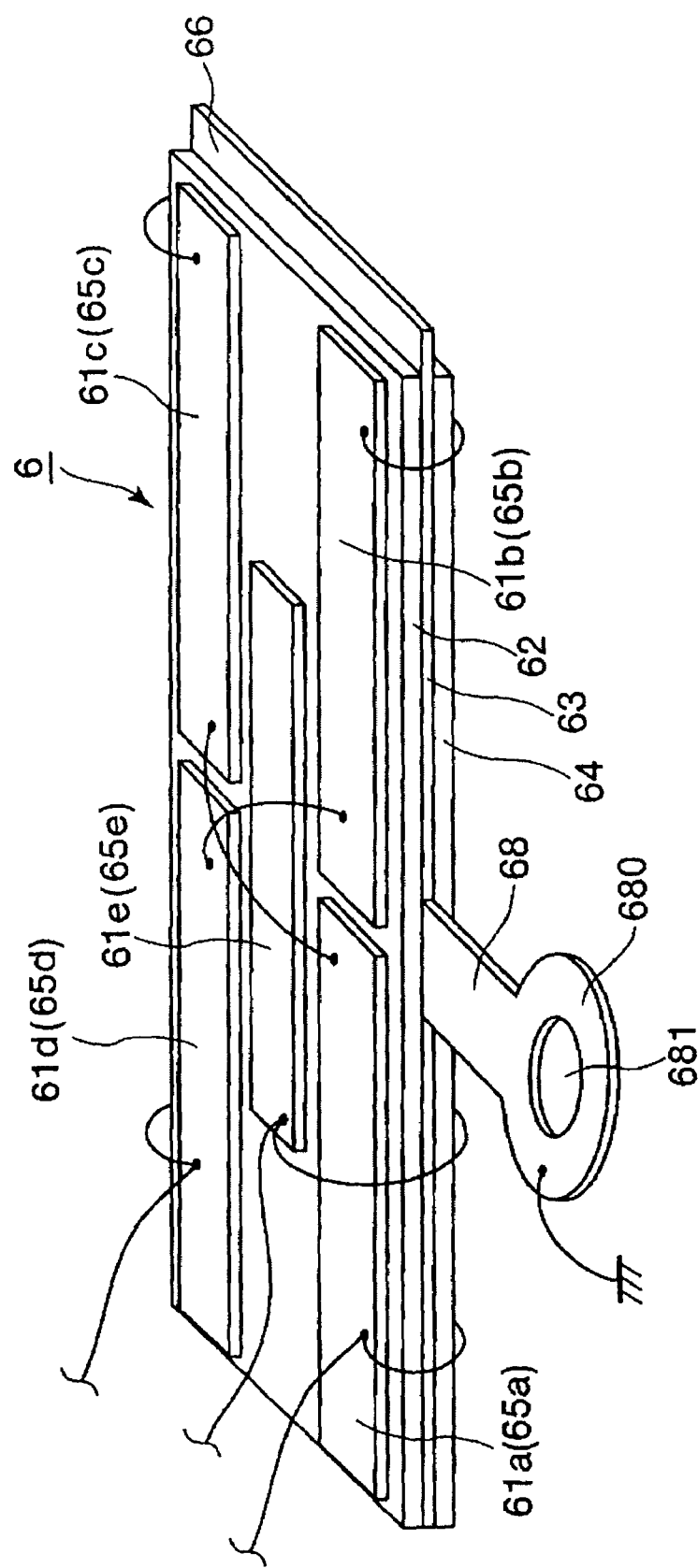
FIG. 10 is a perspective view of a vibrating element of an operating apparatus in a second embodiment according to the present invention.
Figure 11:
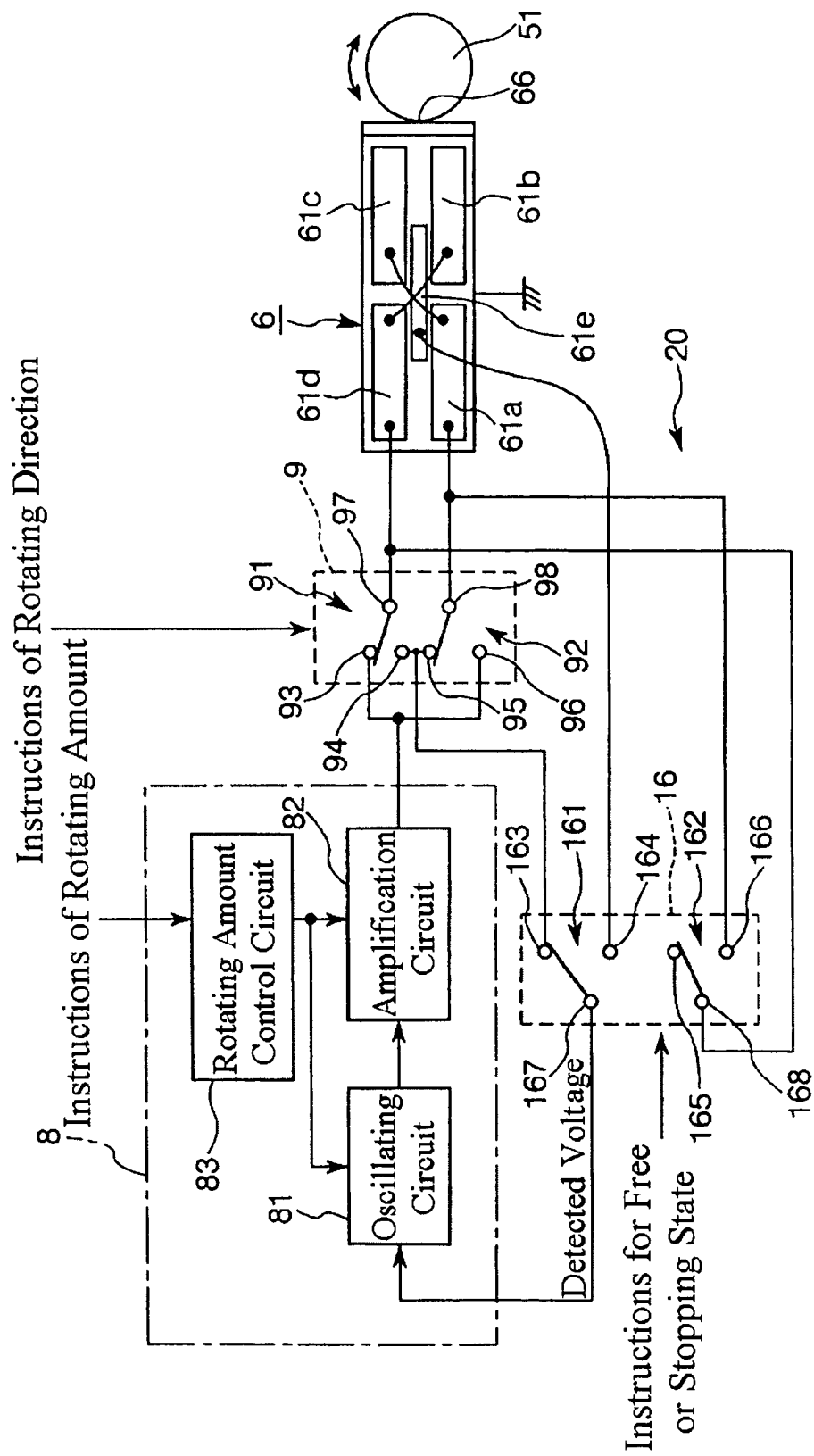
FIG. 11 is a block diagram illustrating circuitry of the operating apparatus in the second embodiment according to the present invention.

FIG. 10 is a perspective view of a vibrating element of an operating apparatus in the second embodiment according to the present invention. FIG. 11 is a block diagram illustrating circuitry of the operating apparatus in the second embodiment according to the present invention.

Hereinafter, the operating apparatus 1 in the second embodiment will be described, focusing on different points between the above-mentioned first embodiment and the second embodiment. In this regard, explanation of items including the same matters and the like is omitted.

The operating apparatus 1 in the second embodiment has four modes including a first mode in which a driven element 5 is maintained in a stopping state; a second mode in which the driven element 5 can be rotated (displaced) (i.e., the driven element 5 lies in a free state); a third mode in which the driven element 5 is rotated in a reverse direction; and a fourth mode in which the driven element 5 is rotated in a forward direction. The operating apparatus 1 is adapted to select one of the first, second, third, and fourth modes by selecting any of conducting patterns to each of electrodes to change a vibrating pattern of a vibrating element 6. Hereinafter, more specific explanations will be given as follows.

As shown in FIG. 10, in the vibrating element 6, five plate-shaped electrodes 61*a*, 61*b*, 61*c*, 61*d*, and 61*e* are disposed at the upper side of a piezoelectric element 62 in FIG. 10, while five plate-shaped electrodes 65*a*, 65*b*, 65*c*, 65*d*, and 65*e* are disposed at the lower side of a piezoelectric element 64 in FIG. 10. (The electrodes 65*a*, 65*b*, 65*c*, 65*d*, and 65*e* are not shown in FIG. 10, but reference numerals of these electrodes are merely designated using parentheses.)

In other words, the piezoelectric element 62 is substantially equally divided (partitioned) into four rectangular areas. The rectangular electrodes 61*a*, 61*b*, 61*c*, and 61*d* are respectively disposed at the divided areas. In a same way, the piezoelectric element 64 is divided (partitioned) into four rectangular areas. The rectangular electrodes 65*a*, 65*b*, 65*c*, and 65*d* are respectively disposed at the divided areas.

Further, the rectangular electrode 61*e* is disposed at a central portion of the piezoelectric element 62, while the rectangular electrode 65*e* is disposed at a central portion of the piezoelectric element 64. The longitudinal direction of each of the electrodes 61*e*, 65*e* substantially corresponds with that (the long side direction) of the vibrating element 6. The electrodes 61*e* and 65*e* are detecting electrodes that are used for detecting a voltage to be induced between a reinforcing plate 63 and each of electrodes 61*e*, 65*e*, i.e., a voltage to be induced (an induced voltage) in response to a component in a longitudinal direction of the vibration of the vibrating element 6 (i.e., a component of the longitudinal vibration). Further, the electrodes 61*e*, 65*e* are used at the second mode.

In this case, the electrodes 65*a*, 65*b*, 65*c*, 65*d*, and 65*e* are disposed at the back faces of the electrodes 61*a*, 61*b*, 61*c*, 61*d*, and 61*e*, respectively.

The electrodes 61*a*, 61*c* lying at one diagonal line in a front face are electrically connected to the electrodes 65*a*, 65*c* lying at a corresponding diagonal line in a back face. In a same way, the electrodes 61*b*, 61*d* lying at the other diagonal line in the front face are electrically connected to the electrode 65*b*, 65*d* lying at a corresponding diagonal line in the back face. (Hereinafter, to "electrically connected" is merely referred to as "connected.")

As shown in FIG. 11, the conducting circuit 20 of the operating apparatus 1 in the second embodiment has: a switch 9; a switch 16; and a drive circuit 8 provided with an oscillating circuit 81, an amplification circuit 82, and a rotating amount control circuit 83.

The switch 9 is switching means for switching between conducting electrodes and electrodes to be used as vibration detecting means. When the switch 9 is switched, a rotative direction of the driven element 5 can be changed.

The switch 9 has two switching sections 91, 92 that operate simultaneously with each other. The electrode 61*d* of the vibrating element 6 is connected to a terminal 97 of the switching section 91. The electrode 61*a* is connected to a terminal 98 of the switching section 92.

Further, each of a terminal 93 of the switching section 91 and a terminal 96 of the switching section 92 is connected to an output side of the amplification circuit 82 in the drive circuit 8. An AC voltage is applied from the amplification circuit 82 to each of the terminals 93, 96.

The reinforcing plate 63 of the vibrating element 6 is connected to ground.

Further, each of a terminal 94 of the switching section 91 and a terminal 95 of the switching section 92 is connected to an input side of the oscillating circuit 81 in the drive circuit 8.

The switch 16 has two switching sections 161, 162 that operate simultaneously with each other.

A terminal 163 of the switching portion 161 is connected to the terminals 94, 95 of the switch 9. A terminal 164 of the switching portion 161 is connected to the electrode 61*e* of the vibrating element 6.

Further, a terminal 167 of the switching portion 161 is connected to the input side of the oscillating circuit 81 in the drive circuit 8.

A terminal 166 of the switching portion 162 is connected to the terminal 98 of the switch 9 and the electrode 61*a* of the vibrating element 6. A terminal 168 of the switching portion 162 is connected to the terminal 97 of the switch 9 and the electrode 61*d* of the vibrating element 6.

In this regard, explanation of the drive circuit 8 will be omitted because it is the same as one in the first embodiment described above.

Next, each of the above-mentioned modes will be described.

In the first mode, there does not occur excitation with relative to the vibrating element 6. In other words, an electric power is not supplied to any of the above-mentioned electrodes. In this case, since the contact portion 66 of the vibrating element 6 abuts on (is pressed to) the contacted element 51, and the driven element 5 is maintained in a stopping state by frictional force between the contact portion 66 and the contacted element 51. This makes it possible to maintain the driven element 5 in a stopping state. Namely, it is possible to prevent the driven element 5 from being moved, and to maintain the driven element 5 at a desired position.

In the second mode, vibration is excited in a direction substantially perpendicular to a tangent line at a portion where the contact portion 66 abuts on an outer circumferential surface 511 of the contacted element 51. In other words, an electric power is supplied to the electrodes 61*a*, 61*b*, 61*c*, 61*d*, 65*a*, 65*b*, 65*c*, and 65*d* at both diagonal lines of both faces of the vibrating element 6, whereby an AC voltage is applied between the reinforcing plate 63 and each of the electrodes 61*a*, 61*b*, 61*c*, 61*d*, 65*a*, 65*b*, 65*c*, and 65*d*. This makes the vibrating element 6 repeatedly undergo extension and contraction in its longitudinal direction (in its long side direction), i.e., vibrate (longitudinally vibrate) with minute amplitude in its longitudinal direction. In other words, the contact portion 66 of the vibrating element 6 undergoes vibration (reciprocates) in its longitudinal direction (in its long side direction).

When the vibrating element 6 undergoes contraction, the contacted element 51 is away from the contact portion 66 so that frictional force between the contacted element 51 and the contact portion 66 disappears or decreased and therefore the driven element 5 is in a free state in FIG. 11. Thus, the driven element 5 can be freely rotated in both counterclockwise and clockwise directions. This makes it possible to freely move the driven element 5. On the other hand, when the vibrating element 6 undergoes extension, the contacted element 51 receives pushing force from the contact portion 66. However, since the direction of the pushing force is substantially perpendicular to the tangent line, the driven element 5 does not rotate in either the counterclockwise direction or the clockwise direction in FIG. 11, and therefore the driven element 5 does not move.

Thus, the contacted element 51, i.e., the driven element 5 lies in a free state by vibration of the vibrating element 6, and can freely move in both directions.

In the third mode, vibration is excited, which at least has a displacing component of vibration in the reverse rotating direction of the driven element 5 (the circumferential direction component S2 shown in FIG. 7). In other words, an electric power is supplied to the electrodes 61*a*, 61*c*, 65*a*, and 65*c* that are located at one diagonal line of both faces of the vibrating element 6, whereby an AC voltage is applied between the reinforcing plate 63 and each of the electrodes 61*a*, 61*c*, 65*a*, and 65*c*. As mentioned in the first embodiment, this makes the driven element 5 rotate in the clockwise direction in FIG. 1 (in the reverse direction). At this time, the electrodes 61*b*, 61*d*, 65*b*, and 65*d* located at the other diagonal line of both faces of the vibrating element 6 to which the electric power is not applied are used as vibration detecting means for detecting vibration of the vibrating element 6.

In the fourth mode, vibration is excited, which at least has a displacing component of vibration in the forward rotating direction of the driven element 5 (the circumferential direction component S2 shown in FIG. 8). In other words, an electric power is supplied to the electrodes 61*b*, 61*d*, 65*b*, and 65*d* that are located at one diagonal line of both faces of the vibrating element 6, whereby an AC voltage is applied between the reinforcing plate 63 and each of the electrodes 61*b*, 61*d*, 65*b*, and 65*d*. As mentioned in the first embodiment, this makes the driven element 5 rotate in the counterclockwise direction in FIG. 1 (in the forward direction). At this time, the electrodes 61*a*, 61*c*, 65*a*, and 65*c* located at the other diagonal line of both faces of the vibrating element 6 to which the electric power is not applied are used as vibration detecting means for detecting vibration of the vibrating element 6.

Next, the operation of the operating apparatus 1 will be explained with reference to FIG. 11.

In a state where the power switch is ON, when instructions for stopping/freeing the driven element 5 or instructions for a rotative direction and a rotating amount (for example, rotation number and/or rotation angle) of the driven element 5 are given, the switch 9, the switch 16, and the rotating amount control circuit 83 of the drive circuit 8 are operated based on such instructions. Namely, any one of the first mode, the second mode, the third mode, and the fourth mode described above is established.

In the case (of the third mode) where instructions indicate that the contacted element 51 is to be rotated in the counterclockwise direction in FIG. 11 (in the forward direction), i.e., the driven element 5 is to be rotated in the clockwise direction in FIG. 3, the switch 16 is switched so that the terminal 163 and the terminal 167 of the switch 16 are connected, and the terminal 165 and the terminal 168 of the switch 16 are connected, while the switch 9 is switched so that the terminal 94 and the terminal 97 of the switch 9 are connected, and the terminal 96 and the terminal 98 of the switch 9 are connected. Thus, the output side of the amplification circuit 82 in the drive circuit 8 is conducted to the electrodes 61*a*, 61*c*, 65*a*, and 65*c* of the vibrating element 6, and the input side of the oscillating circuit 81 in the drive circuit 8 is conducted to the electrodes 61*b*, 61*d*, 65*b*, and 65*d* of the vibrating element 6.

Each of the oscillating circuit 81 and the amplification circuit 82 of the drive circuit 8 is controlled by the rotating amount control circuit 83.

An AC voltage outputted from the oscillating circuit 81 is amplified by the amplification circuit 82 and then applied between the reinforcing plate 63 and each of the electrodes 61*a*, 61*c*, 65*a*, and 65*c*. Thus, as mentioned above, each of the portions corresponding to the electrodes 61*a*, 61*c*, 65*a*, and 65*c* of the vibrating element 6 undergoes expansion and contraction repeatedly, and the contact portion 66 of the vibrating element 6 undergoes vibration (reciprocates) in a slanting direction as represented by the arrow b shown in FIG. 7, and vibrates (moves) in an elliptical manner as represented by the arrow c shown in FIG. 7. The contacted element 51 receives the frictional force (pushing force) from the contact portion 66 when the portions corresponding to the electrodes 61*a*, 61*c*, 65*a*, and 65*c* of the vibrating element 6 are extended, and this repeating frictional force (pushing force) makes the driven element 5 to be moved (rotated) in the clockwise direction in FIG. 1 (in the reverse direction).

When the vibrating element 6 rotates in the clockwise direction in FIG. 1 (in the reverse direction) with respect to the contacted element 51, the driven element 5 moves (rotates) in the same direction together with the vibrating element 6.

At this time, the electrodes 61*b*, 61*d*, 65*b*, and 65*d* to which an AC voltage is not applied (not activated) function as detecting electrodes that are used to detect a voltage to be induced between the reinforcing plate 63 and each of the electrodes 61*b*, 61*d*, 65*b*, and 65*d* (induced voltage).

The detected induced voltage (detected voltage) is inputted to the oscillating circuit 81, and then based on such detected voltage, the oscillating circuit 81 outputs an AC voltage having a frequency (resonant frequency) at which amplitude of the vibrating element 6 becomes maximum, namely, the detected voltage becomes maximum. This makes it possible to move (rotate) the driven element 5 efficiently.

Further, the rotating amount control circuit 83 controls operation for conducting to each of those electrodes based on the instructed rotating amount (target value) of the driven element 5.

Namely, the rotating amount control circuit 83 allows the oscillating circuit 81 and the amplification circuit 82 to activate until the rotating amount of the driven element 5 reaches the instructed rotating amount (target value) of the driven element 5, thereby driving the vibrating element 6 and rotating the driven element 5 together with the vibrating element 6.

On the contrary thereto, in the case (of the fourth mode) where the instructions indicate that the contacted element 51 is to be rotated in the clockwise direction in FIG. 11 (in the reverse direction), i.e., the driven element 5 is to be rotated in the counterclockwise direction in FIG. 3, as shown in FIG. 11, the switch 16 is switched so that the terminal 163 and the terminal 167 of the switch 16 are connected, and the terminal 165 and the terminal 168 of the switch 16 are connected, while the switch 9 is switched so that the terminal 93 and the terminal 97 of the switch 9 are connected, and the terminal 95 and the terminal 98 of the switch 9 are connected. Thus, the output side of the amplification circuit 82 in the drive circuit 8 is conducted to the electrodes 61*b*, 61*d*, 65*b*, and 65*d* of the vibrating element 6, and the input side of the oscillating circuit 81 in the drive circuit 8 is conducted to the electrodes 61a, 61c, 65a, and 65c of the vibrating element 6. Since the following operations are the same as those of the case where the instructions indicate that the contacted element 51 is to be rotated in the counterclockwise direction in FIG. 11, a description thereof will be omitted.

In the case (of the first mode) where the instructions indicate that the contacted element 51, i.e., the driven element 5 is to be kept in the stopping state, as shown in FIG. 11, the switch 16 is switched so that the terminal 163 and the terminal 167 of the switch 16 are connected, and the terminal 165 and the terminal 168 of the switch 16 are connected.

The rotating amount control circuit 83 does not allow the oscillating circuit 81 and the amplification circuit 82 to activate. Namely, an AC voltage is not applied to any of the electrodes of the vibrating element 6.

The contact portion 66 of the vibrating element 6 is in pushing contact with (abuts on) the contacted element 51, and the frictional force between the contact portion 66 and the contacted element 51 keeps the driven element 5 in the stopping state. This makes it possible to keep the driven element 5 in the stopping state. Namely, the driven element 5 is prevented from moving, thereby maintaining the driven element 5 at a desired position.

In this regard, in the case of the first mode, the switches 9 and 16 may be switched in any manner as long as an AC voltage is not applied to any of the electrodes of the vibrating element 6.

In the case (of the second mode) where the instructions indicate that the contacted element 51 is to be set in the free state, in other words, the instructions indicate that the driven element 5 is to be set in the free state, the switch 16 is switched so that the terminal 164 and the terminal 167 of the switch 16 are connected, and the terminal 166 and the terminal 168 of the switch 16 are connected. Thus, the output side of the amplification circuit 82 of the drive circuit 8 is conducted to the electrodes 61a, 61b, 61c, 61d, 65a, 65b, 65c, and 65d of the vibrating element 6, and the electrodes 61e and 65e of the vibrating element 6 are conducted to the input side of the oscillating circuit 81 of the drive circuit 8.

An AC voltage outputted from the oscillating circuit 81 is amplified by the amplification circuit 82 and then applied between the reinforcing plate 63 and each of the electrodes 61a, 61b, 61c, 61d, 65a, 65b, 65c, and 65d. Thus, as mentioned above, the contact portion 66 of the vibrating element 6 undergoes vibration (reciprocates) in its longitudinal direction, whereby the contacted element 51, i.e., the driven element 5 becomes a free state, and it is possible to freely rotate the driven element 5 in both clockwise and counterclockwise directions in FIG. 1.

At this time, the voltage (induced voltage) induced between the reinforcing plate 63 and each of the electrodes 61e and 65e is detected from each of the electrodes 61e and 65e. The detected induced voltage (detected voltage) is inputted to the oscillating circuit 81, and thereafter, based on the detected voltage, the oscillating circuit 81 outputs an AC voltage having a frequency at which amplitude of the longitudinal vibration of the vibrating element 6 becomes maximum, namely, the detected voltage becomes maximum. This makes it possible to rotate the contacted element 51, i.e., the driven element 5 more smoothly.

Here, in the case of the second mode, the switch 9 may be switched in any manner.

According to the operating apparatus 1 in the second embodiment of the present invention, it is possible to obtain effects similar to that of the first embodiment described above.

In this operating apparatus 1, since it is possible to select any state from the four states, which includes a state where the contacted element 51 (driven element 5) is kept in a stopping state, i.e., a state of high friction; a state where the contacted element 51 (driven element 5) is allowed to be rotated (or be moved) (i.e., the contacted element 51 and the driven element 5 are set in a free state), i.e., a state of low friction; a state where the driven element 5 is rotated in the reverse direction; and a state where the driven element 5 is rotated in the forward direction, there is wide applicability.

In the above-mentioned vibrating element 6, the case where the electrodes to drive the vibrating element 6 are divided into four sections has been described. However, this is just one example for selectively exciting the longitudinal vibration and the bending vibration of the vibrating element 6, and in the present invention, the structure and the method of driving the vibrating element 6 are not limited to the above-mentioned ones.

Additionally, in the present invention, the operating apparatus 1 is adapted so that the third mode or the fourth mode may be omitted, and the driven element 5 may be rotated in only one direction. Even in this case, the driven element 5 can be moved (i.e., rotated) in both of the directions in FIG. 1 using the only one vibrating element 6.

(Third Embodiment)

Next, a description will be given for a third embodiment of the operating apparatus according to the present invention.

Figure 12:
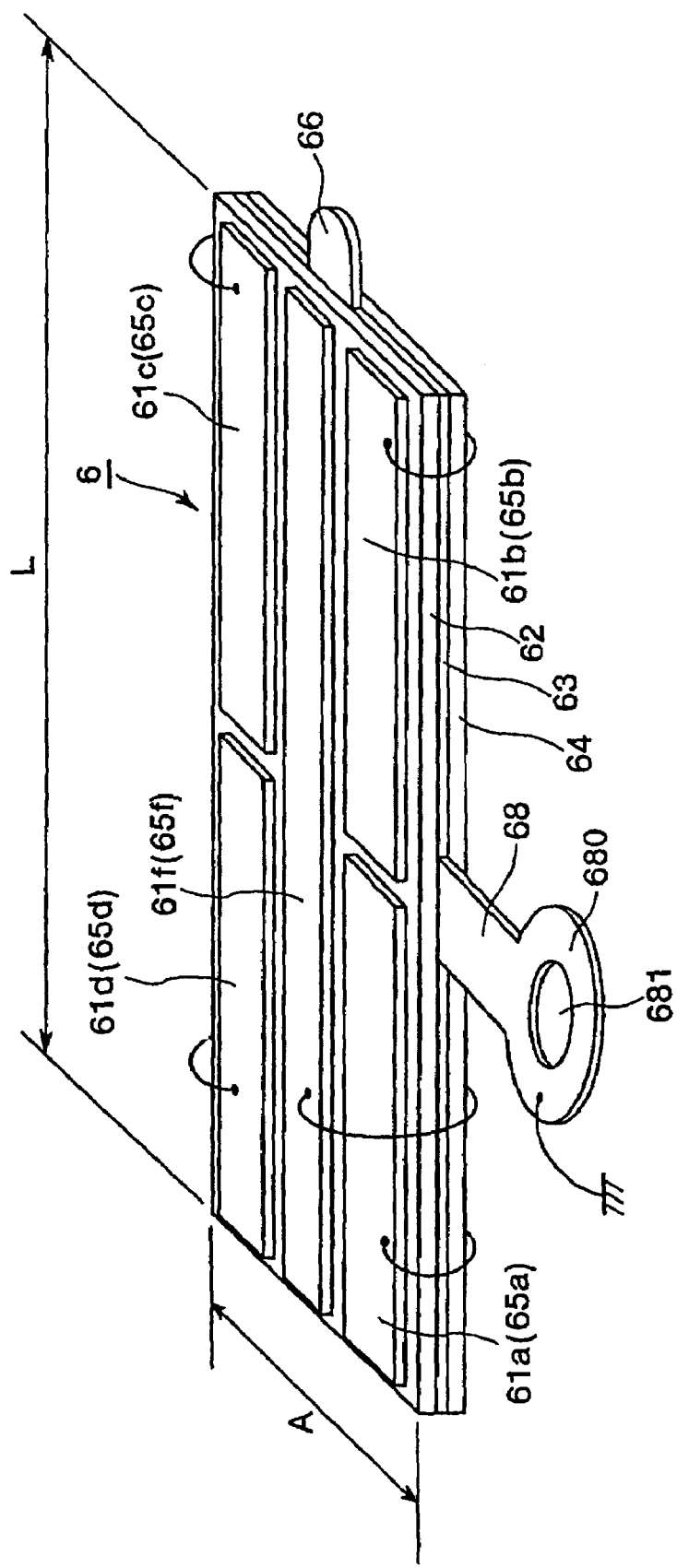
FIG. 12 is a perspective view illustrating a vibrating element of the operating apparatus in a third embodiment of the present invention.

FIG. 12 is a perspective view illustrating a vibrating element of the operating apparatus in a third embodiment according to the present invention. Now, in following explanations using FIG. 12, an upper side is referred to as "upper," a lower side is referred to as "lower," a right side is referred to as "right," and a left side is referred to as "left."

Hereinafter, an operating apparatus 1 in the third embodiment will be described, focusing on different points between the above-mentioned first or second embodiment and the third embodiment. In this regard, explanation of items including the same matters and the like is omitted.

The operating apparatus 1 in the third embodiment has characteristics on the point that the operating apparatus 1 can further employ a fifth mode and a sixth mode in which longitudinal vibration and bending vibration are combined, in addition to the first to fourth modes described in the second embodiment. The fifth mode and the sixth mode can be arbitrarily selected by changing a conducting pattern to each of electrodes 61a–61d, 61f, 65a–65d, and 65f in the same way as the first to fourth modes.

The vibrating element 6 of the operating apparatus 1 has an electrode 61f at the upper side of a piezoelectric element 62 in FIG. 12 and an electrode 65f at the lower side thereof in place of the detecting electrodes 61e and 65e in the second embodiment. The electrodes 61f and 65f are rectangular and plate-shaped, and has a substantially same length as a length in a longitudinal direction of the vibrating element 6. The electrodes 61f and 65f are located at a central portion of the vibrating element 6 along its longitudinal direction. Further, the electrode 61f and the electrode 65f are electrically connected between the front face and the back face of the vibrating element 6. The electrodes 61f and 65f are also electrically connected to a conducting circuit 20 (now shown) in the same way as the other electrodes 61a–61d and 65a–65d (the electrodes 65a–65d are not shown in FIG. 12.).

Figure 13:
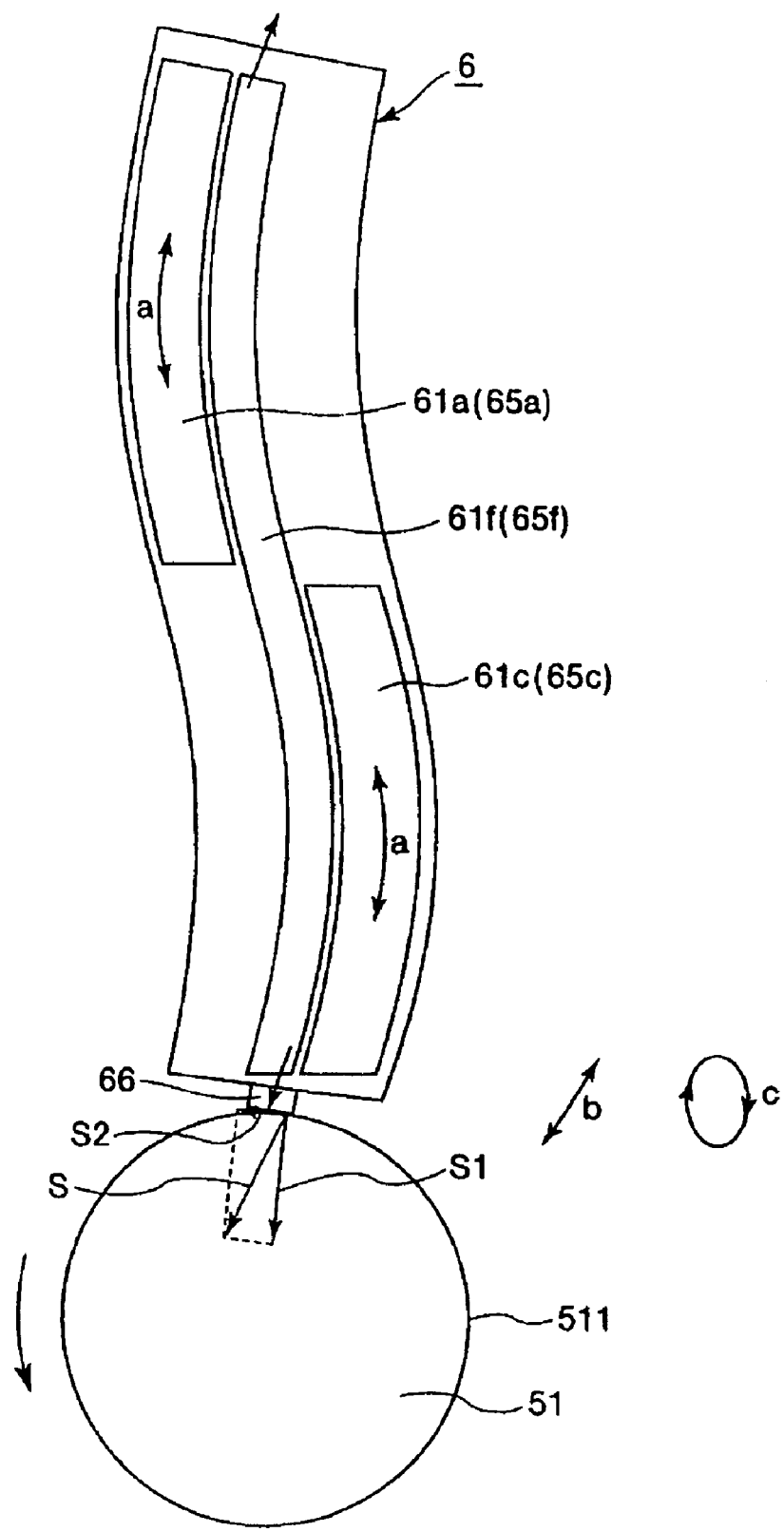
FIG. 13 is a plan view showing a vibrating state of the vibrating element shown in FIG. 12.

FIG. 13 is a plan view showing a vibrating state of the vibrating element of the operating apparatus shown in FIG. 12.

In the fifth mode of the operating apparatus 1, an electric power is applied to the electrodes 61a, 61c, 65a, and 65c that are located at one diagonal line of both faces of the vibrating element 6, whereby an AC voltage is applied between the reinforcing plate 63 and each of the electrodes 61a, 61c, 65a, and 65c. Then, each of portions of the vibrating element 6 corresponding to these electrodes repeatedly undergoes extension and contraction so that the entire vibrating element 6 undergoes bending secondary vibration. By the bending secondary vibration, the contact portion 66 of the vibrating element 6 undergoes vibration (reciprocates) in a slanting direction represented by an arrow b in FIG. 13, or vibrates (moves) in an elliptical manner as represented by an arrow c in FIG. 13. Thus, the contacted element 51 repeatedly receives frictional force (pushing force) from the contact portion 66 so that the contacted element 51 is rotated in the counterclockwise direction in FIG. 13 (in the forward direction), i.e., so that the driven element 5 is rotated in the clockwise direction in FIG. 1.

In the fifth mode, an electric power is further applied to the electrodes 61f and 65f at the central portion of the vibrating element 6, whereby the portions of the piezoelectric elements 62, 64 corresponding to the electrodes 61f and 65f repeatedly and partly undergo extension and contraction at a high speed. Then, the portions on the centerline in the longitudinal direction of the vibrating element 6 undergo longitudinal vibration with minute amplitude along its longitudinal direction. This is referred to as longitudinal primary vibration. By the longitudinal primary vibration, the contact portion 66 increases the pushing force in the longitudinal direction of the vibrating element 6 to bias the contacted element 51 with the increased (stronger) pushing force. This makes it possible to obtain high driving force in comparison with the case where the vibrating element 6 is driven by only the bending secondary vibration.

In the fifth mode, the electrodes 61b, 61d, 65b, and 65d to which the electric power is not applied serve as vibration detecting means for detecting vibration of the vibrating element 6. The electrodes 61b, 61d, 65b, and 65d detect a voltage (induced voltage) to be induced between the reinforcing plate 63 and each of the electrodes 61b, 61d, 65b, and 65d to which the electric power is not applied when the vibrating element 6 is driven, and thereafter the induced voltage is inputted to an oscillating circuit 81. Based on the detected induced voltage, the oscillating circuit 81 outputs an AC voltage having a predetermined frequency (resonant frequency) at which amplitude of the vibrating element 6 becomes maximum, i.e., the induced voltage becomes maximum. This makes it possible to rotate the driven element 5 efficiently. In this regard, the electrodes 61b, 61d, 65b, and 65d to which the electric power is not applied operate in the same way as those in the first embodiment.

Figure 14:
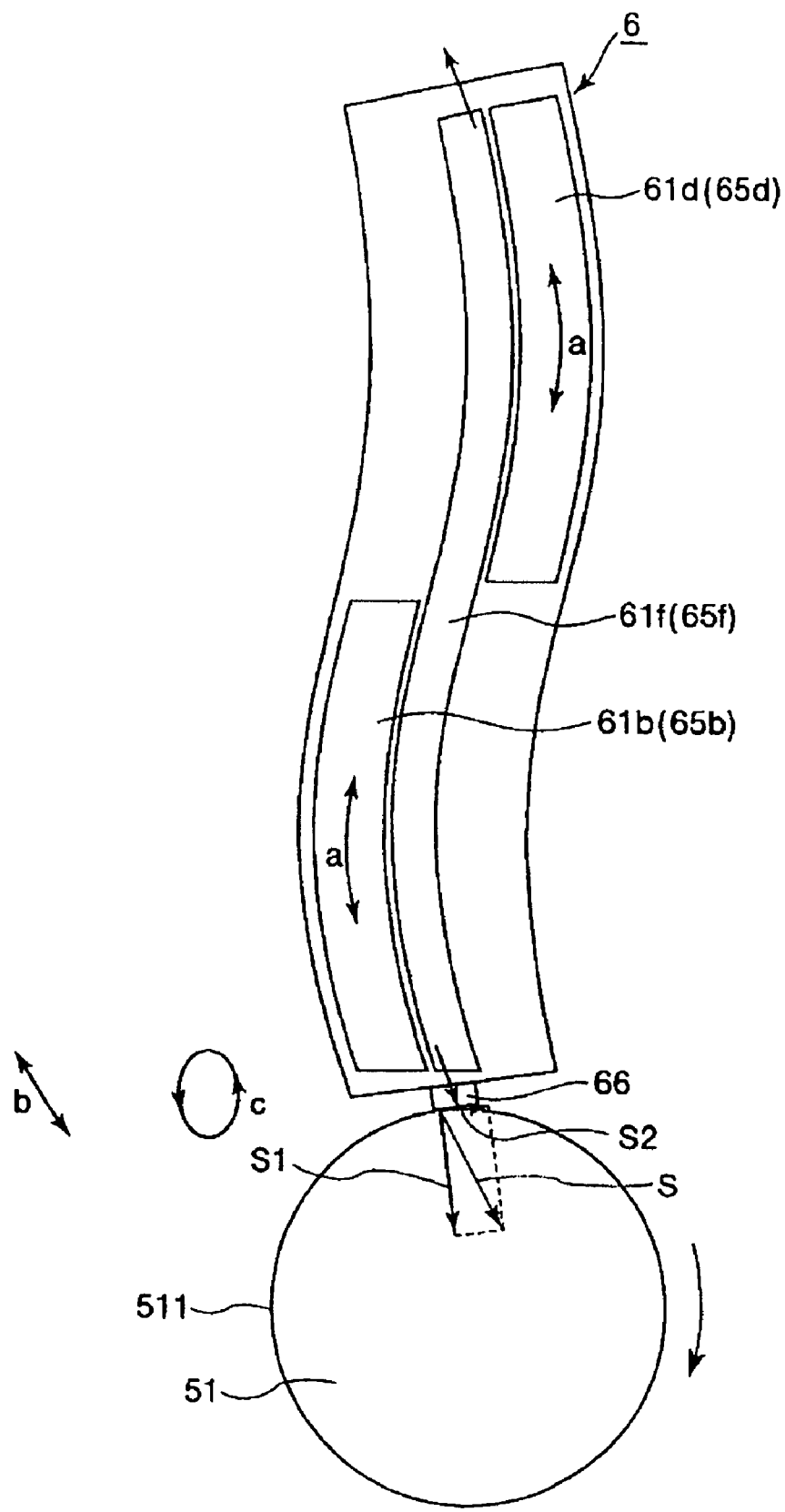
FIG. 14 is a plan view showing a vibrating state of the vibrating element shown in FIG. 12.

FIG. 14 is a plan view showing a vibrating state of the vibrating element shown in FIG. 12.

In the sixth mode of the operating apparatus 1, an electric power is applied to the electrodes 61b, 61d, 65b, and 65d that are located at the other diagonal line of both faces of the vibrating element 6, and to the electrodes 61f and 65f that are located at the central portion of the vibrating element 6. The vibrating element 6 undergoes vibration with motion symmetrical to that in case of the fifth mode, thereby rotating the contacted element 51 in the clockwise direction in FIG. 14 (in the reverse direction), i.e., rotating the driven element 5 in the counterclockwise direction in FIG. 1. This also makes it possible to obtain stronger driving force in the reverse direction.

In sixth mode, the electrodes 61a, 61c, 65a, and 65c to which the electric power is not applied serve as vibration detecting means for detecting vibration of the vibrating element 6. The electrodes 61a, 61c, 65a, and 65c detect a voltage (induced voltage) to be induced between the reinforcing plate 63 and each of the electrodes 61a, 61c, 65a, and 65c to which the electric power is not applied when the vibrating element 6 is driven, and thereafter the induced voltage is inputted to an oscillating circuit 81. Based on the detected induced voltage, the oscillating circuit 81 outputs an AC voltage having a predetermined frequency (resonant frequency) at which amplitude of the vibrating element 6 becomes maximum, i.e., the induced voltage becomes maximum. This makes it possible to rotate the driven element 5 efficiently. In this regard, the electrodes 61b, 61d, 65b, and 65d to which the electric power is not applied operate in the same way as those in the first embodiment.

Here, as shown in FIG. 12, in the case where a length of a body portion of the vibrating element 6 in the longitudinal direction (the direction in which the vibrating element 6 undergoes expansion and contraction by the application of the AC voltage), i.e., a length of the long side of the vibrating element 6 is determined to be a length L, and where a length of the body portion of the vibrating element 6 in a direction substantially perpendicular to the longitudinal direction (the length of the body portion in the direction substantially perpendicular to the direction in which the contact portion 66 protrudes), i.e., a length of the short side of the vibrating element 6 is determined to be a width length A, a ratio between the width A and the length L is not especially limited. However, it is preferable that the ratio is about 2 to 5. Further, it is more preferable that the ratio is about 3 to 4. Furthermore, it is most preferable that the ratio is about 3.54. The relationship between the resonant frequencies of the longitudinal primary vibration and the bending secondary vibration becomes appropriate in the above-mentioned conditions, and it is possible to obtain satisfactory drive efficiency.

In this regard, in the operating apparatus 1, the vibrating modes of the vibrating element 6 are not limited to the first to sixth modes mentioned above, and any optional vibrating mode may be employed within an obvious scope of one skilled in the art. For example, in the vibrating element 6 described in FIG. 12, longitudinal primary vibration may be excited in the vibrating element 6 by applying the AC voltage only to the electrodes 61f, 65f, or complex vibration of combination of longitudinal primary vibration and bending tertiary vibration may be excited in the vibrating element 6 by applying the AC voltage to all of the electrodes 61a–61f and 65a–65f and delaying the application timing to predetermined electrodes.

Figure 17:
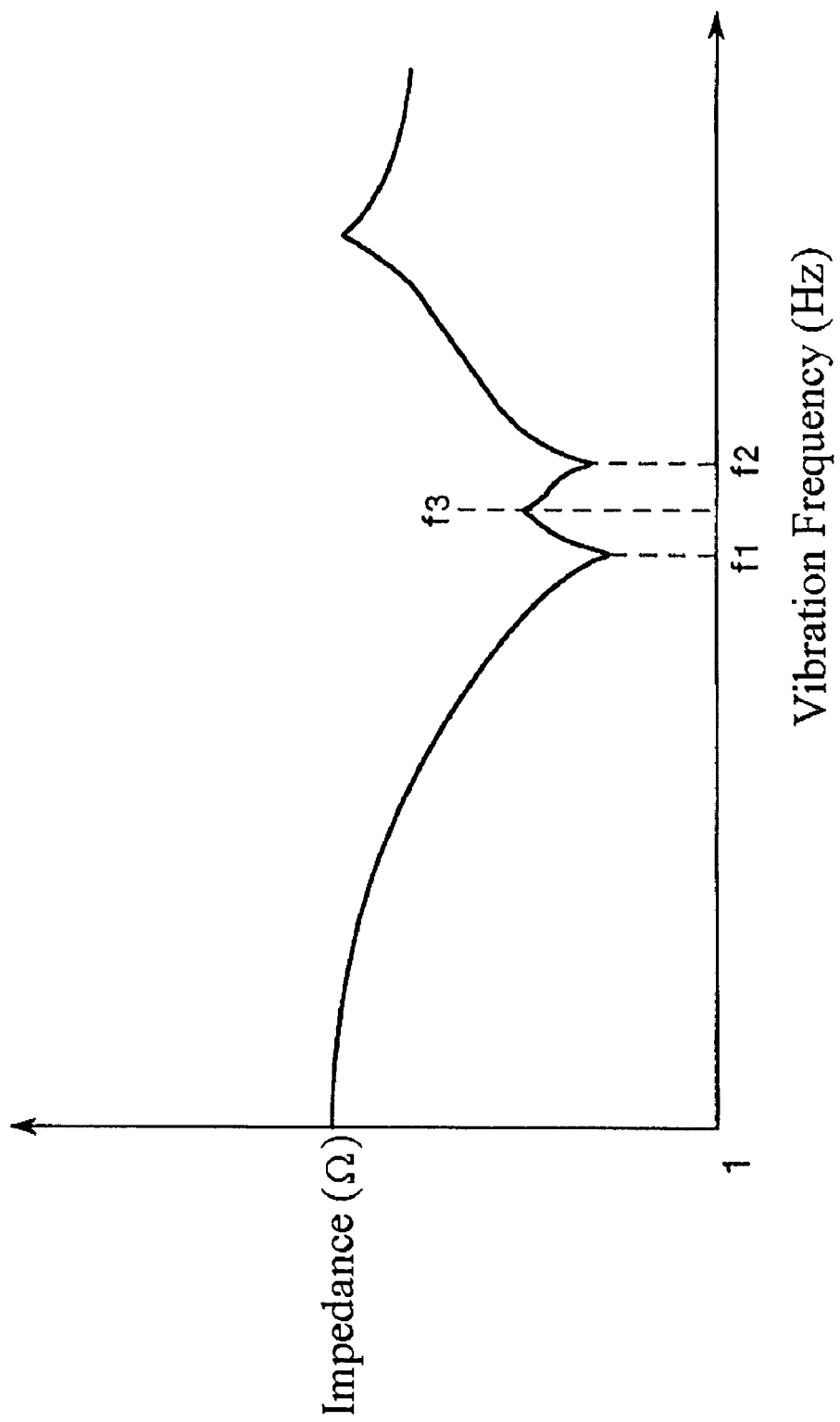
FIG. 17 is a graph showing electric characteristics of the vibrating element.

FIG. 17 is a graph showing electric characteristics of the vibrating element shown in FIG. 12. In this graph shown in FIG. 17, the horizontal axis represents the vibration frequency (Hz) of the vibrating element 6 during driving, and the perpendicular axis represents impedance (□) of the piezoelectric elements 62, 64 while the vibrating element 6 is not in pushing contact with (abuts on) the contacted element 51.

As shown in FIG. 17, the vibrating element 6 has a resonant frequency f1 for the longitudinal primary vibration and a resonant frequency f2 for the bending secondary vibration. There are minimum values of impedance at these resonant frequencies f1, f2. Here, these resonant frequencies f1, f2 are frequencies peculiar to the vibrating element 6. The resonant frequencies f1, f2 can be arbitrarily changed by selecting a shape or a size of the vibrating element 6, a position of the contact portion 66, or the like. In this vibrating element 6 of the present invention, the resonant frequencies f1, f2 are set so as to be close each other. For example, in this vibrating element 6, the resonant frequency f2 of the bending secondary vibration is higher than the resonant frequency f1 of the longitudinal primary vibration by about 1 to 2%. In the constitution of the vibrating element 6, when the vibrating element 6 is driven at a frequency near the resonant frequencies f1, f2, in particular, at a frequency between the resonant frequencies f1 and f2, complex vibration of combination of the longitudinal primary vibration and the bending secondary vibration can be obtained. Further, the complex vibration noticeably has the drive characteristics of both the longitudinal primary vibration and the bending secondary vibration because the drive frequency is near both the resonant frequency f1 of the longitudinal primary vibration and the resonant frequency f2 of the bending secondary vibration. This makes it possible to efficiently obtain the drive characteristics of both the longitudinal primary vibration and the bending secondary vibration when the vibrating element 6 is driven.

Further, in the vibrating element 6, these resonant frequencies f1, f2 are set so as to be predetermined values different from each other (see FIG. 17). Thus, a change of impedance of the piezoelectric elements 62, 64 becomes sluggish near the resonance point in the pushing state, whereby the boundary between the resonant frequency f1 of the longitudinal primary vibration and the resonant frequency f2 of the bending secondary vibration becomes unclear. Moreover, it is possible to constitute a wide frequency band where the value of the impedance becomes lower near the resonant frequencies f1, f2, in particular, at a frequency between the resonant frequencies f1 and f2. This makes it possible to carry out the excitation combining the longitudinal primary vibration and the bending secondary vibration at a wide frequency band, and to stabilize an input power to the vibrating element 6 while driving.

In the operating apparatus 1, the vibrating element 6 is driven at a vibration frequency (drive frequency) between the resonant frequency f1 of the longitudinal primary vibration and the resonant frequency f2 of the bending secondary vibration. In this case, when the drive frequency of the vibrating element 6 is brought close to the resonant frequency f1 of the longitudinal primary vibration, the amplitude of the longitudinal vibration in the direction in which the pushing force is increased becomes larger. Thus, the frictional force between the contact portion 66 of the vibrating element 6 and the contacted element 51 increases, and therefore the driving force of the vibrating element 6 is enhanced (i.e., it becomes a high driving force type). On the other hand, when the drive frequency of the vibrating element 6 is brought close to the resonant frequency f2 of the bending secondary vibration, the component in the rotating direction of the contacted element 51 (i.e., the driven element 5) within the vibrating displacement of the vibrating element 6 becomes larger. Thus, the rotating amount of the driven element 5 per unit vibration increases, and therefore the drive speed (rotational speed) of the driven element 5 is enhanced (i.e., it becomes a high speed type). In this way, by shifting the resonant frequency f1 of the longitudinal primary vibration against the resonant frequency f2 of the bending secondary vibration, and appropriately setting (selecting) the drive frequency of the vibrating element 6 within the frequency band between the resonant frequencies f1 and f2, it is possible to obtain arbitrary drive characteristics with respect to driving force, drive speed, or the like, for example.

In this regard, in this vibrating element 6, it is preferable that the resonant frequency f2 of the bending secondary vibration is higher than the resonant frequency f1 of the longitudinal primary vibration by about 0.5 to 3.0%. It is more preferable that the resonant frequency f2 is higher than the resonant frequency f1 by about 1.0 to 2.0%.

By setting a difference between the resonant frequencies f1 and f2 to the range mentioned above, since the longitudinal primary vibration and the bending secondary vibration occur simultaneously (i.e., both vibrations are combined), it is possible to obtain the frictional force and the driving force simultaneously, thereby being able to obtain satisfactory drive characteristics.

In this regard, the present invention is not limited to this constitution. The resonant frequency f1 of the longitudinal primary vibration may be higher than the resonant frequency f2 of the bending secondary vibration. In this case, it is preferable that the resonant frequency f1 of the longitudinal primary vibration is higher than the resonant frequency f2 of the bending secondary vibration by about 0.5 to 3.0%. It is more preferable that the resonant frequency f1 is higher than the resonant frequency f2 by about 1.0 to 2.0%. In addition, in order to obtain a lager mechanical output by applying (inputting) larger electric power to the operating apparatus 1, it is preferable that the impedance at the drive frequency is reduced.

Further, in the vibrating element 6, the impedance at the resonant frequency f2 of the bending secondary vibration is larger than that at the resonant frequency f1 of the longitudinal primary vibration. Moreover, as shown in FIG. 17, there is a frequency f3 at which the impedance has a maximum value between the resonant frequencies f1 and f2. It is preferable that the vibrating element 6 is driven at a predetermined drive frequency between the resonant frequency f1 of the longitudinal primary vibration and the resonant frequency f2 of the bending secondary vibration. It is more preferable that the vibrating element 6 is driven at a predetermined drive frequency between the resonant frequency f2 and the frequency f3. This makes it possible to excite the vibrating element 6 while driving with a vibrating phase-lag between the longitudinal vibration and the bending vibration. Therefore, it is possible to vibrate (move) the contact portion 66 along an elliptical orbit c (see FIGS. 7 and 8), and it is possible to efficiently transmit force from the vibrating element 6 to the contacted element 51 without generating the force to draw the contacted element 51 back.

In this regard, this constitution in which the resonant frequencies f1, f2 are different from and/or close to each other as described above may be applied to the first and second embodiments of the present invention. This makes it possible to obtain effects similar to that of the third embodiment described above.

In the operating apparatus 1 of the third embodiment, five electrodes 61a–61d and 61f, and 65a–65d and 65f are respectively disposed on the piezoelectric elements 62, 64 to realize bi-directional drive of the drive element 5 including the forward and reverse directions (see FIGS. 13 and 14). However, the present invention is not limited to this structure. For example, in the case where the driven element 5 is to be rotated in one direction, the vibrating element 6 may has more simplified structure.

Figure 15:
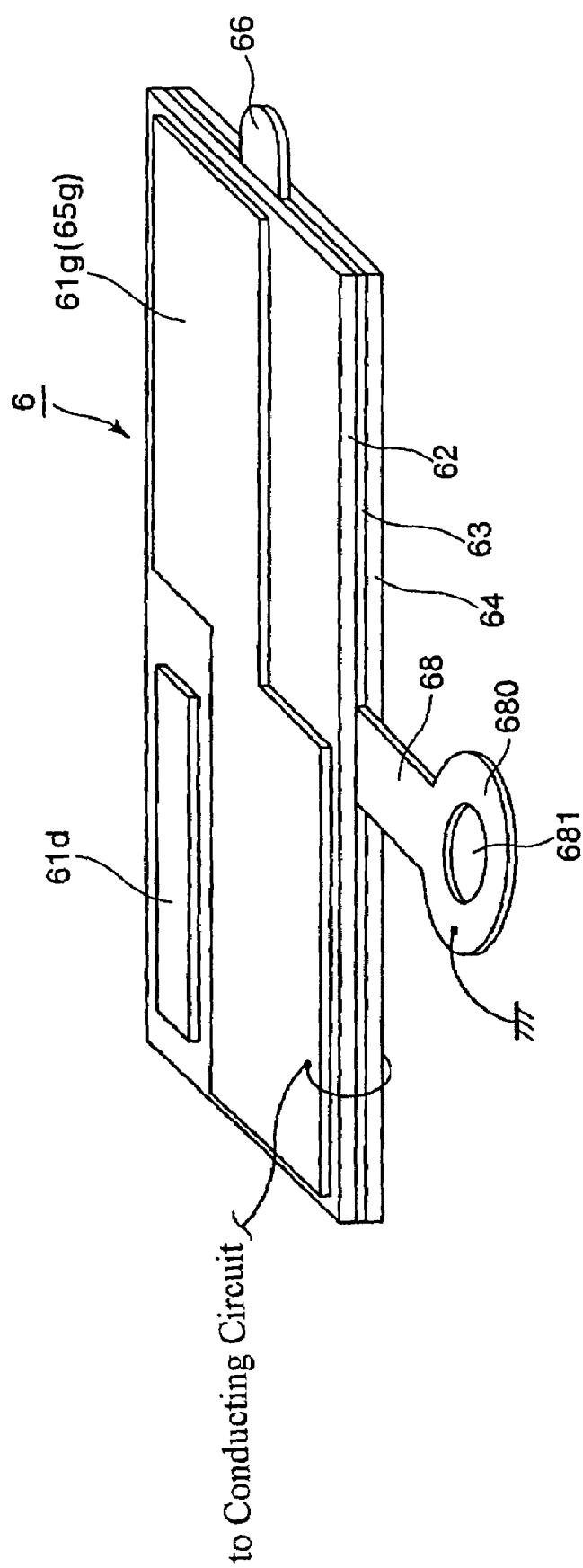
FIG. 15 is a perspective view illustrating a variant of the vibrating element.

FIG. 15 is a perspective view illustrating a variant of the vibrating element shown in FIG. 12. The vibrating element 6 has a single electrode 61g integrating the electrodes 61a,

61c, and 61f at the same positions as those of the electrodes in place of these electrodes 61a, 61c, and 61f in comparison with the vibrating element 6 described in FIG. 12. Similarly, the vibrating element 6 has a single electrode 65g integrating the electrodes 65a, 65c, and 65f at the same position as those of the electrodes in place of these electrodes 65a, 65c, and 65f. The electrode 65g is not shown in FIG. 24, but reference numeral of the electrode is merely designated using parentheses. Further, the electrode 61d is provided independent of the electrode 65d. In addition, the electrodes 61b, 65b, and 65d are omitted in this vibrating element 6.

Figure 16:
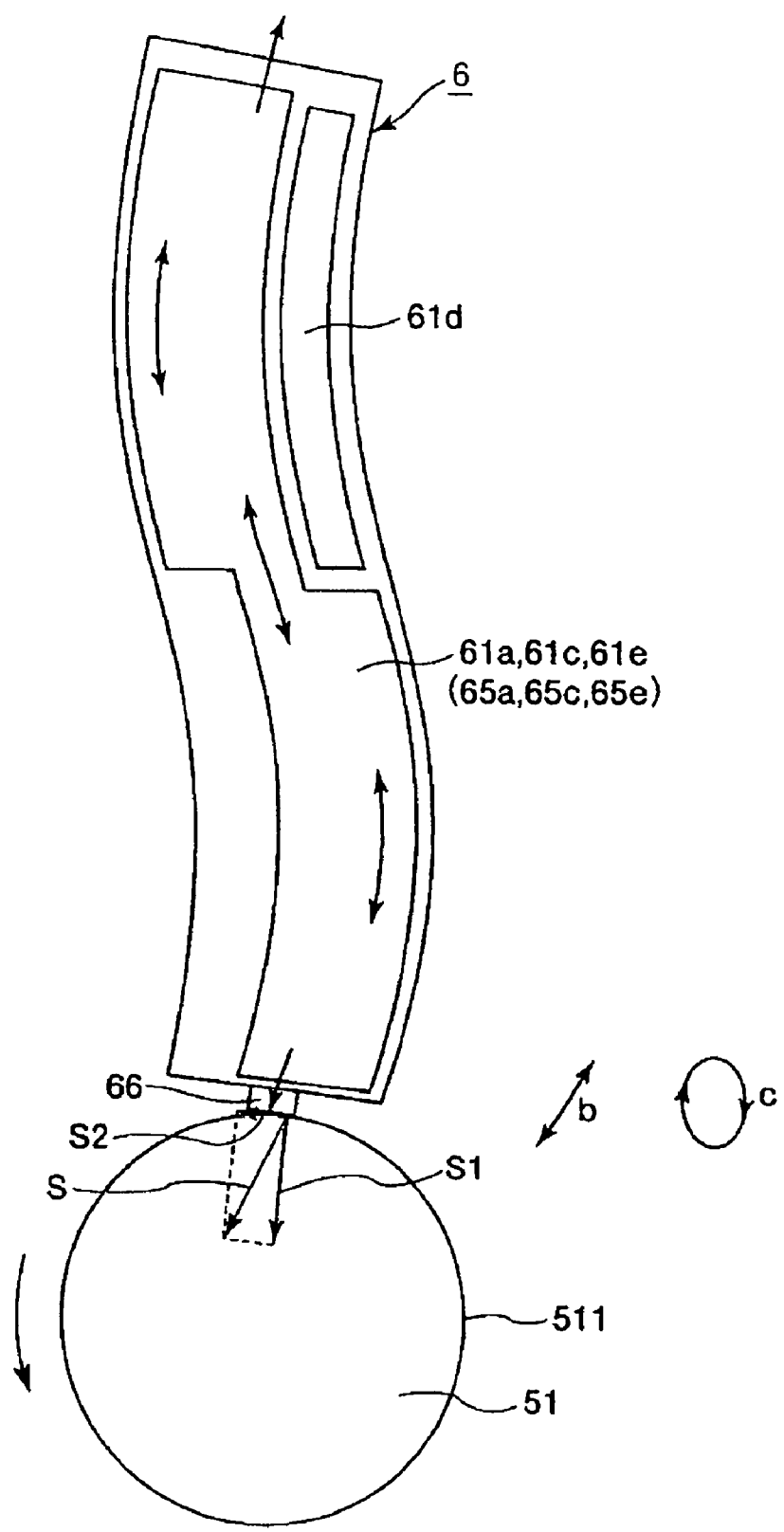
FIG. 16 is a plan view illustrating a vibrating state of the vibrating element shown in FIG. 15.

FIG. 16 is a plan view illustrating a vibrating state of the vibrating element shown in FIG. 15. An electric power is supplied to these single electrode 61g, 65g of the vibrating element 6. Portions corresponding to the electrodes 61g, 65g of the piezoelectric elements 62, 64 repeatedly undergo expansion and contraction at a high speed (see FIG. 16). Then, by the expansion and contraction of portions corresponding to the electrodes 61a, 61c, 65a, and 65c within the portions corresponding to the electrodes 61g, 65g, bending secondary vibration is generated as well as the operation of the fifth mode mentioned above. Further, by the expansion and contraction of portions corresponding to the electrodes 61f and 65f within the portions corresponding to the electrodes 61g, 65g, longitudinal primary vibration is generated as well as the operation of the fifth mode. Thus, complex vibration of combination of the longitudinal primary vibration and the bending secondary vibration is generated, and the contacted element 51 is rotated in a counterclockwise direction in FIG. 16 (i.e., the driven element 5 is rotated in a clockwise direction in FIG. 2) by means of the same operation as that of the fifth mode.

The electrode 61d is connected to the oscillating circuit 81 of the drive circuit 8 (not shown), and used to hold its oscillating frequency to a proper value.

In this regard, the rotating direction of the driven element 5 is only one direction in this vibrating element 6. According to this vibrating element 6, since the number of electrodes is reduced in comparison with the vibrating element 6 described in FIG. 12, it is possible to simplify the structure of a production (vibrating element), and to shorten (cut down) the manufacturing steps of the production. In addition, since the driven element 5 is driven (rotated) in only one direction, the switch 9 of the conducting circuit 20 can be omitted. This makes it possible to further simplify the production.

On the other hand, a single electrode 61h (not shown) integrating the electrodes 61b, 61d, and 61f may be disposed at the same positions as those of these electrodes in place of the electrodes 61b, 61d, and 61f, and a single electrode 65h (not shown) integrating the electrodes 65b, 65d, and 65f may be disposed at the same positions as those of these electrodes in place of the electrodes 65b, 65d, and 65f. Further, the other electrodes 61a, 61c, 65a, and 65c may be omitted. In this case, the contacted element 51 can be rotated in the direction reverse to that mentioned above (the clockwise direction in FIG. 16), namely, the driven element 5 can be rotated in the counterclockwise direction in FIG. 1.

(Fourth Embodiment)

Next, a description will be given for an operating apparatus 1 of a fourth embodiment according to the present invention.

Figure 18:
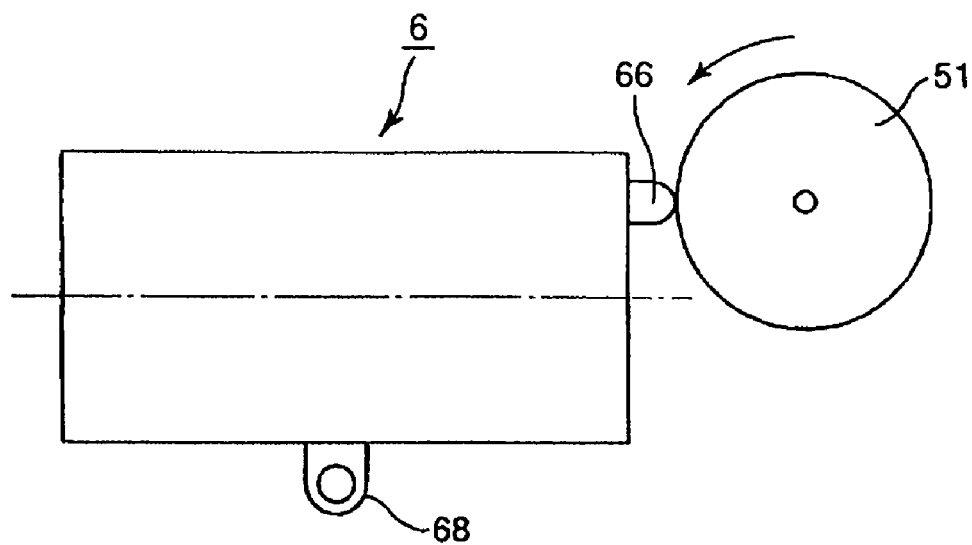
FIG. 18 is a plan view illustrating an operating apparatus in a fourth embodiment according to the present invention.

FIG. 18 is a plan view illustrating an operating apparatus in the fourth embodiment according to the present invention.

Hereinafter, an operating apparatus 1 in the fourth embodiment will be described, focusing on different points between the above-mentioned first embodiment and the fourth embodiment. In this regard, explanation of items including the same matters and the like is omitted.

In the operating apparatus 1 of the first embodiment described above, the contact portion 66 was arranged at the center of the short side of the vibrating element 6. However, the position of the contact portion 66 is not limited to this position. For example, as shown in FIG. 18, the contact portion 66 may be located at a position offset from the central portion of the short side of the vibrating element 6, i.e., at a position offset from on the centerline in the longitudinal direction of the vibrating element 6. According to such a configuration, there occur (1) unbalanced state of weight of the vibrating element 6 by offset of the setting position of the contact portion 66; (2) unbalanced state of arrangement of the electrodes 61a–61f and 65a–65f for driving the vibrating element 6; (3) unbalanced state owing that reaction force from the driven element 5 acts on the vibrating element 6 out the centerline of the vibrating element 6; and the like. In this case, when the vibrating element 6 undergoes extension and contraction by supplying the electric power to the vibrating element 6, complex vibration of combination of longitudinal vibration and bending vibration is readily induced. This makes it possible to enhance a drive efficiency of the vibrating element 6.

In this regard, in terms of reason for the item (3) mentioned above, if the center of the contacted element 51 is offset from the centerline of the vibrating element 6 even though the contact portion 66 protrudes from the entire short side of the vibrating element 6 as shown in FIG. 10, the vibrating element 6 has similar effects. Therefore, such a structure is also included in the present invention.

In the same way, if the center of the contacted element 51 is offset from the centerline of the vibrating element 6 even though the contact portion 66 protrudes from the center portion of the short side of the vibrating element 6, the vibrating element 6 has similar effects, and the complex vibration may be induced. Therefore, such a structure is also included in the present invention.

Figure 20:
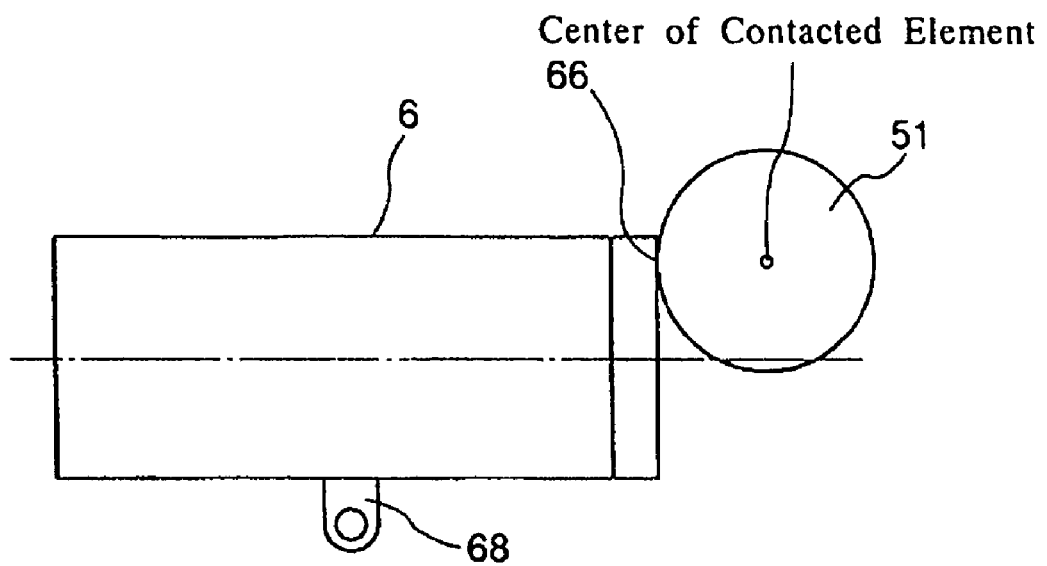
FIG. 20 is a perspective view illustrating a variant of the vibrating element.

Hereinafter, a further explanation will be given with reference to FIGS. 20 and 21.

Since the operations of the items (1)–(3) described above are independent from each other, they can be freely combined. For example, as shown in FIG. 20, by adopting the constitution in which the contact portion 66 is provided throughout the short side of the vibrating element 6 and the contact portion 66 is in contact with the contacted element 51 at a point offset from the centerline of the vibrating element 6, the operations of the items (2) and (3) make the complex vibration of combination of the longitudinal vibration and the bending vibration be induced. Therefore, it is possible to improve the drive efficiency.

Figure 21:
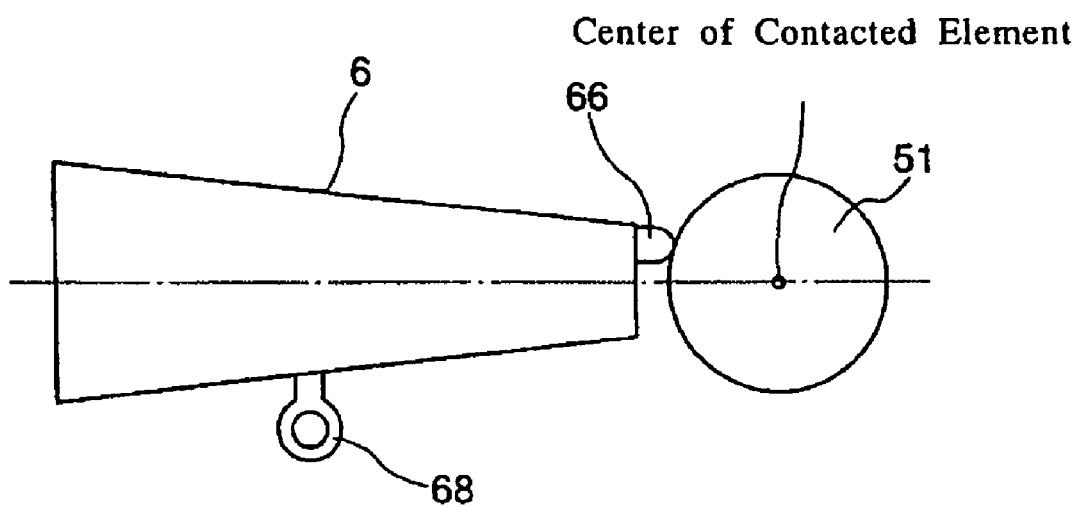
FIG. 21 is a perspective view illustrating a variant of the vibrating element.

Further, as shown in FIG. 21, by adopting the constitution in which the vibrating element 6 has a trapezoid-shaped body portion and the contact portion 66 is provided at a position offset from the centerline in the longitudinal direction of the vibrating element 6 to bring into contact with the contacted element 51, the reaction force from the driven element 5 can act offset from the centerline of the vibrating element 6, and the displacement in a direction orthogonal to the longitudinal direction of the vibrating element 6 can be generated. Thus, it is possible to improve the drive efficiency.

Figure 19:
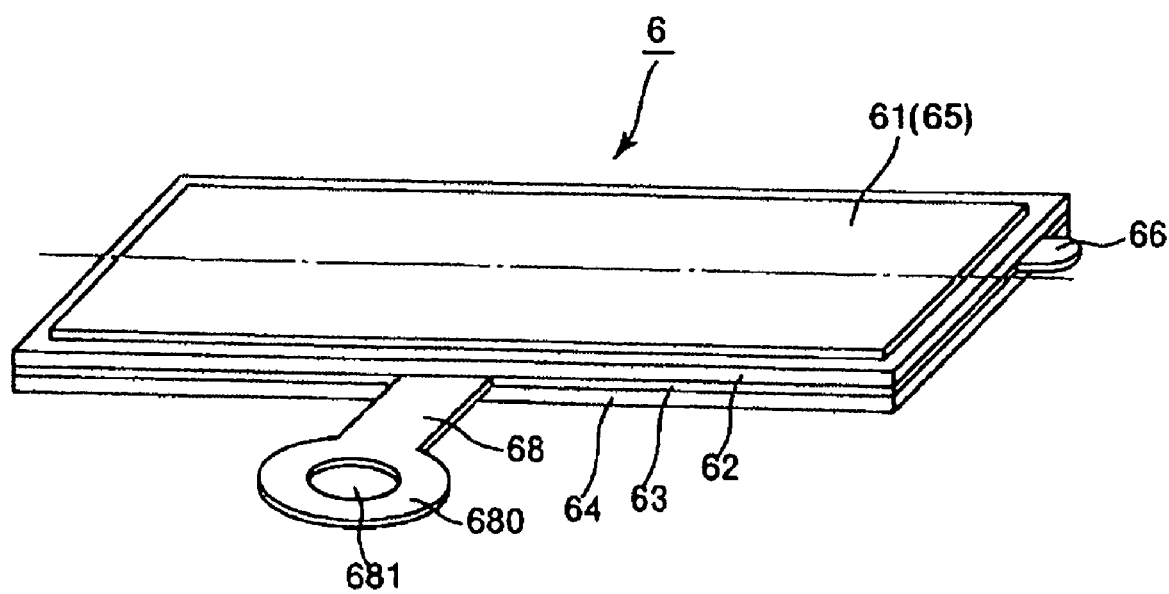
FIG. 19 is a perspective view illustrating a variant of the vibrating element shown in FIG. 18.

In addition, in the fourth embodiment, it is possible to adopt the constitution in which single electrodes 61, 65 are disposed at almost whole areas of the piezoelectric elements 62, 64. FIG. 19 is perspective view illustrating a variant of the vibrating element shown in FIG. 18. According to such a structure, since complex vibration of longitudinal vibration and bending vibration is induced by unbalanced states of the vibrating element 6, it is possible to drive the driven element 5 efficiently with a simplified construction of electrodes.

Figure 34:
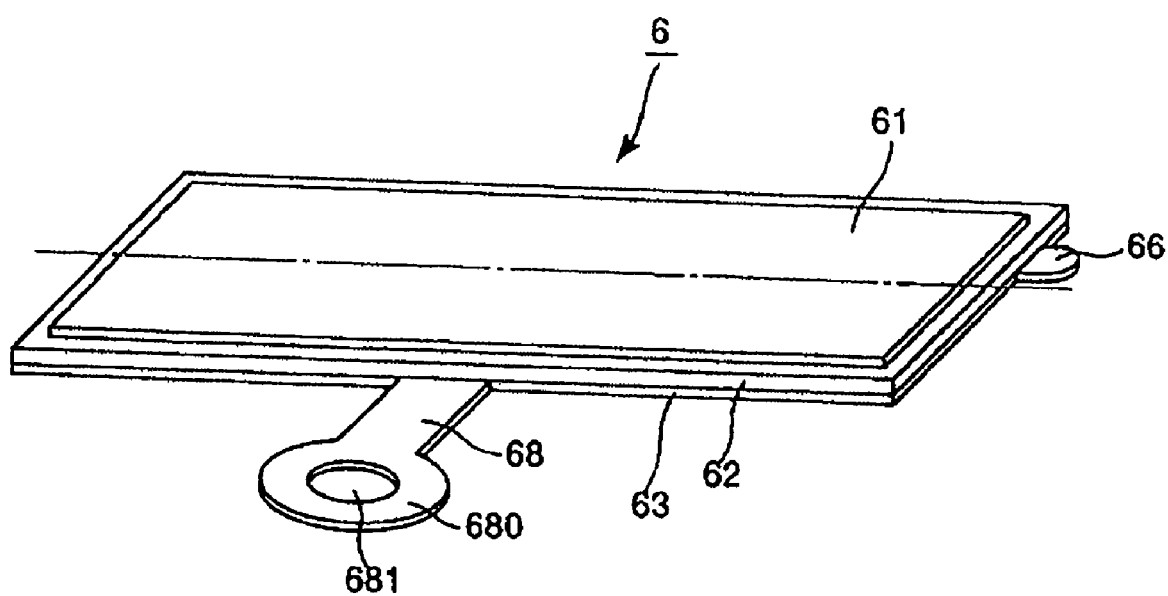
FIG. 34 is a perspective view illustrating a variant of the vibrating element.

FIG. 34 is a perspective view illustrating a variant of the vibrating element shown in FIG. 19. As shown in FIG. 34, the vibrating element 6 may be constructed so that a piezoelectric element 62 is provided on one face (one side) of a reinforcing plate 63 and a single electrode 61 is provided on the entire piezoelectric element 62.

According to such a structure, since complex vibration of longitudinal vibration and bending vibration is induced by unbalanced states of the vibrating element 6, it is possible to drive the driven element 5 efficiently with a simplified construction of electrodes.

Further, since the piezoelectric element 62 and the electrode 61 are disposed on one face of the reinforcing plate 63, it is possible to simplify the structure of the vibrating element 6 and to make the thickness of the vibrating element 6 thinner. Therefore, it is possible to reduce a manufacturing cost of the operating apparatus 1.

Moreover, the constitution in which the piezoelectric element 62 and the electrode 61 are provided on one face of the reinforcing plate 63 can be applied to the vibrating elements (ultrasonic motors) such as one having various structures described above, and one having structures described later. A shape or a size of the vibrating element 6, a position of the contact portion 66, or the like is not especially limited.

In other words, in the present invention, the vibrating element 6 may have a structure (plan structure) in which the piezoelectric element 62 that undergoes extension and contraction by application of an AC voltage is provided on the reinforcing plate 63 (one face of the reinforcing plate 63) on which the contact portion 66 and the arm portion 68 are integrally formed.

Further, the vibrating element 6 in which the piezoelectric element 62 is provided on only one face of the reinforcing plate 63 can be applied to each embodiment described above or described later.

(Fifth Embodiment)

Next, a description will be given for an operating apparatus in a fifth embodiment of the present invention.

Figure 22:
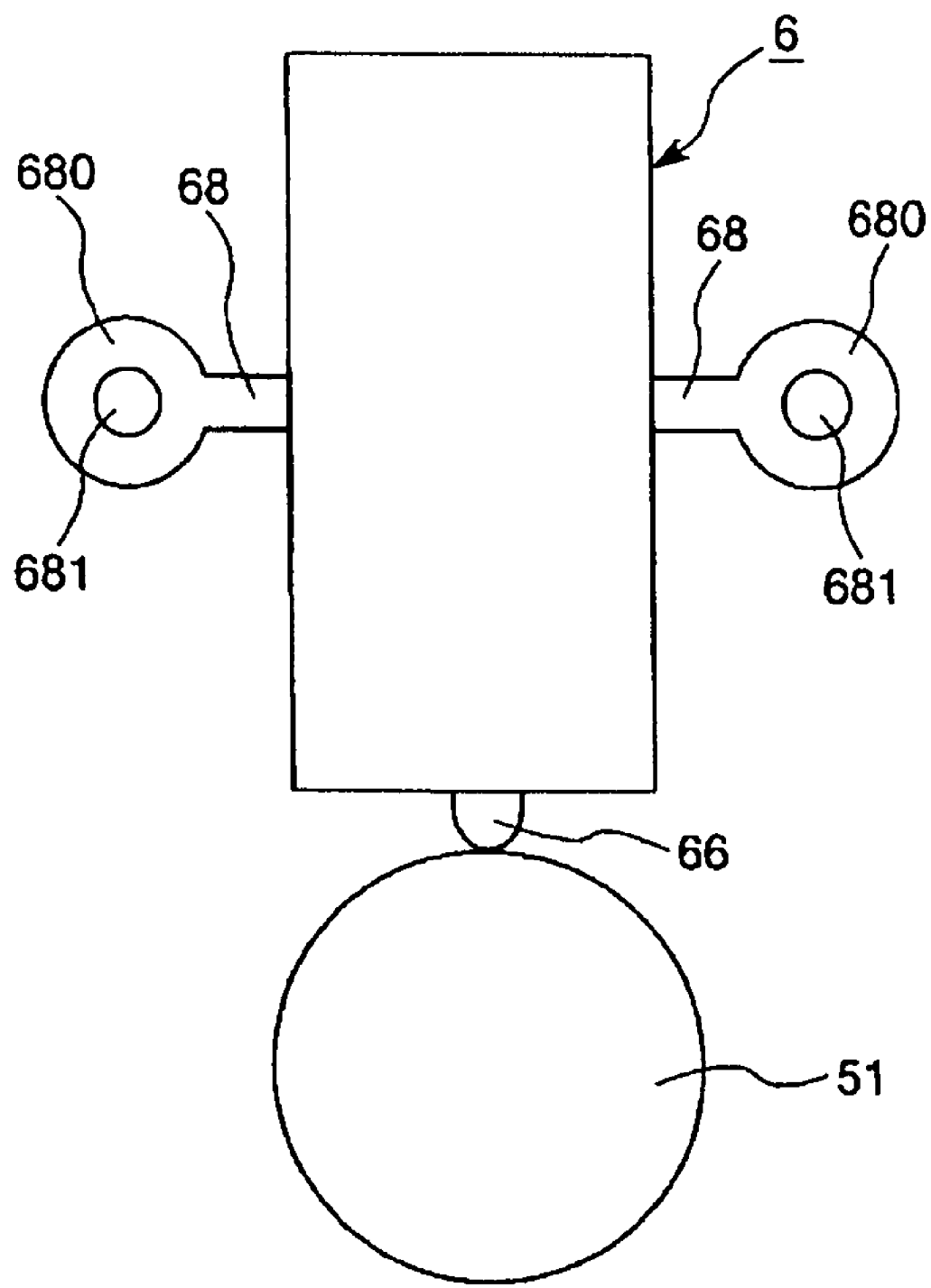
FIG. 22 is a plan view illustrating an ultrasonic motor in the fifth embodiment according to the present invention.

FIG. 22 is a plan view illustrating an ultrasonic motor of an operating apparatus in the fifth embodiment according to the present invention. Now, in following explanations using FIG. 29, an upper side is referred to as "upper," a lower side is referred to as "lower," a right side is referred to as "right," and a left side is referred to as "left."

Hereinafter, an operating apparatus 1 in the fifth embodiment will be described, focusing on different points between the above-mentioned first embodiment and the fifth embodiment. In this regard, explanation of items including the same matters and the like is omitted.

As shown in FIG. 22, in the operating apparatus 1 (ultrasonic motor) of the fifth embodiment according to the present invention, a pair of (two) arm portions 68, 68 each having elasticity (flexibility) are integrally formed on the reinforcing plate 63 of the vibrating plate 6.

The pair of arm portions 68, 68 are respectively provided at substantially central portions of both long sides in the longitudinal direction of the reinforcing plate 63 (a upper-and-lower direction in FIG. 22) so as to protrude in the direction substantially perpendicular to the longitudinal direction thereof and in mutually opposite directions via the reinforcing plate 63 (the body portion of the vibrating element 6) (i.e., they are symmetrical with respect to a vertical direction in FIG. 22).

According to the operating apparatus 1 of the fifth embodiment, it is possible to obtain effects similar to that of the first embodiment described above.

Further, since the pair of arm portions 68, 68 are provided on the vibrating element 6 in this operating apparatus 1, rigidity against the support can be enhanced, whereby it is possible to stably support the vibrating element 6 against external force such as reaction force of the drive or the like. Moreover, since the pair of arm portions 68, 68 are symmetrical, influence on the drive characteristics in both clockwise and counterclockwise directions in FIG. 22 (in right and left directions) can be uniformized. Therefore, the constitution where drive characteristics in both forward and reverse directions are equal can be realized.

Furthermore, each of the constitutions described in the second to fourth embodiments can be applied to this constitution of the fifth embodiment. It is preferable that the constitution of the third embodiment is applied to this constitution of the fifth embodiment.

(Sixth Embodiment)

Next, a description will be given for an operating apparatus in a sixth embodiment according to the present invention.

Hereinafter, an operating apparatus 1 in the sixth embodiment will be described, focusing on different points between the above-mentioned first embodiment and the sixth embodiment. In this regard, explanation of items including the same matters and the like is omitted.

In the operating apparatus 1 of the first embodiment described above, a driven element 5 having a cylinder-shaped contacted element 51 is driven (moved) using a vibrating element 6. However, the present invention is not limited to this structure. The operating apparatus 1 may be constructed so that a driven element 5 having other shape and structure is driven using the vibrating element 6. For example, the contacted element 51 of this operating apparatus 1 is the cylinder-shaped contacted element 51, but the present invention is not limited to this constitution. The contacted element 51 may be a rotational structure having a cylinder shape, a shape having cross-sectional surface of sector form, circular arc form, or the like (not shown in the drawings).

(Seventh Embodiment)

Figure 23:
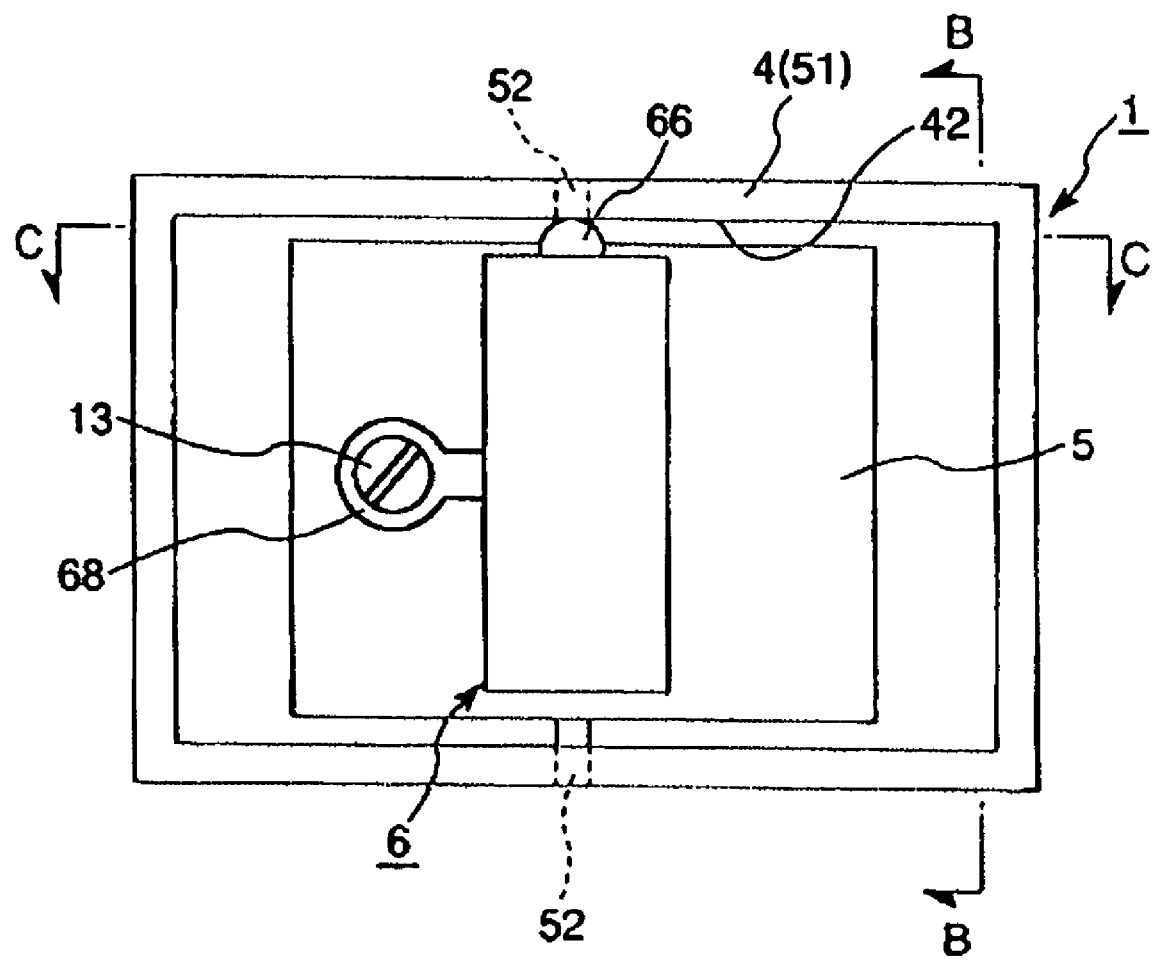
FIG. 23 is a bottom plan view illustrating an operating apparatus in a seventh embodiment according to the present invention.
Figure 24:
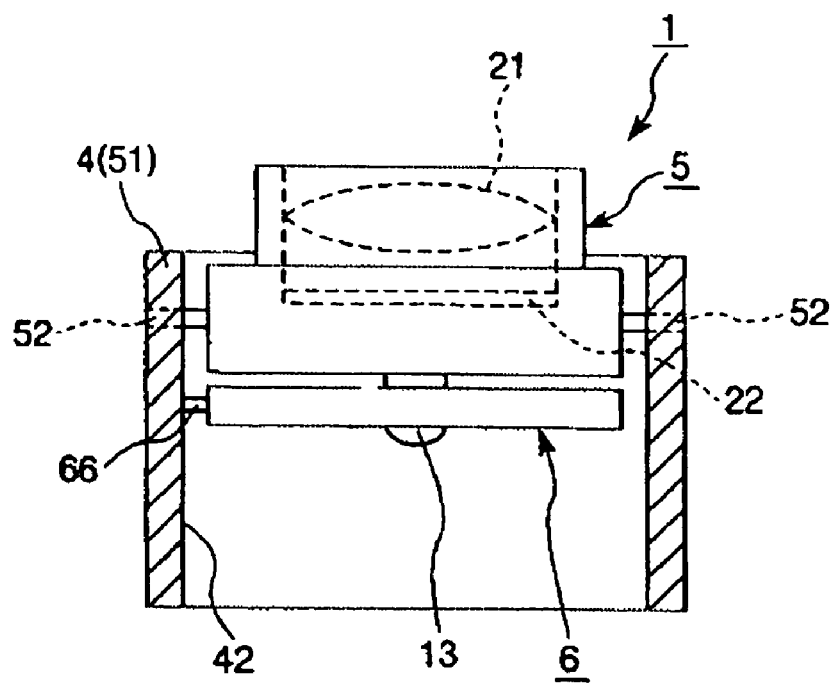
FIG. 24 is a cross-sectional view taken along line B—B of the operating apparatus shown in FIG. 23.
Figure 25:
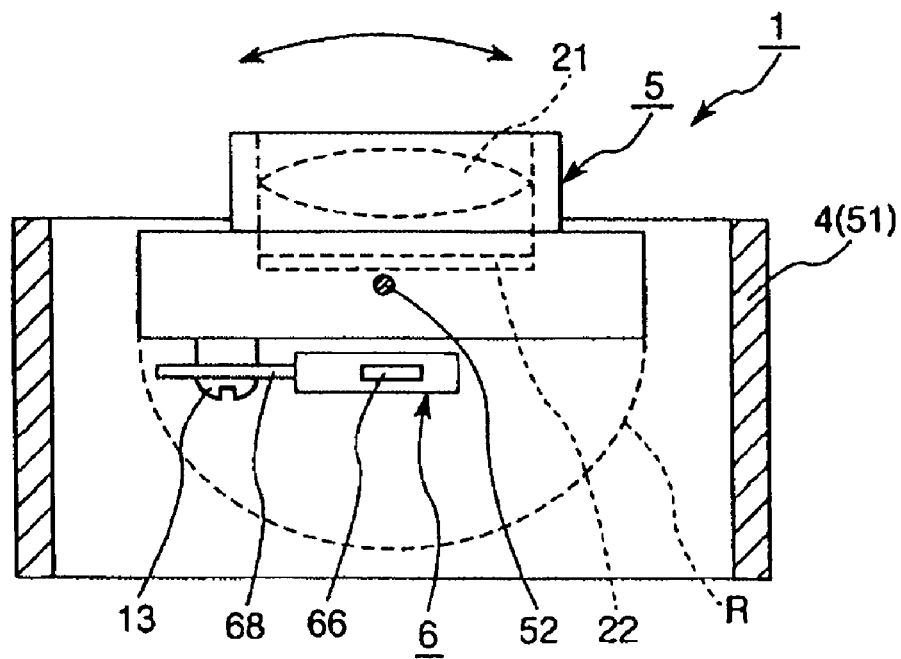
FIG. 25 is a cross-sectional view taken along line C—C of the operating apparatus shown in FIG. 23.

FIG. 23 is a bottom plan view illustrating an operating apparatus in a seventh embodiment according to the present invention. FIG. 24 is a cross-sectional view taken along line B—B of the operating apparatus shown in FIG. 23. FIG. 25 is a cross-sectional view taken along line C—C of the operating apparatus shown in FIG. 23. In these drawings, the same parts (components) as those of the operating apparatus 1 in the embodiments described above are designated as the same reference numerals, and explanations thereof will be omitted. The operating apparatus 1 has a characteristic on the point that a part of the frame 4 (i.e., inner wall surface) constitutes a contacted element 51. The vibrating element 6 in this operating apparatus 1 is fixed under (on) a bottom portion of the driven element 5. Here, the vibrating element 6 is placed close to the bottom portion of the driven element 5 so that the vibrating element 6 does not protrude out of an area in which the driven element 5 rotates (i.e., a rotative excursion area R) when the driven element 5 rotates around a shaft 52. In particular, since the vibrating element 6 has a thin plate-shaped structure, it is suitable for such a structure. Further, the contact portion 66 of the vibrating element 6 comes into frictional contact with one face (inner wall surface) 42 on which the shaft 52 is supported, which is a part of the inner wall surfaces of the frame 4 (contacted element 51). In view of the rotative excursion area R of the driven element 5, the vibrating element 6 is arranged at a predetermined position so that the contact portion 66 does not drop off from the inner wall surface 42 of the frame 4.

Figure 26:
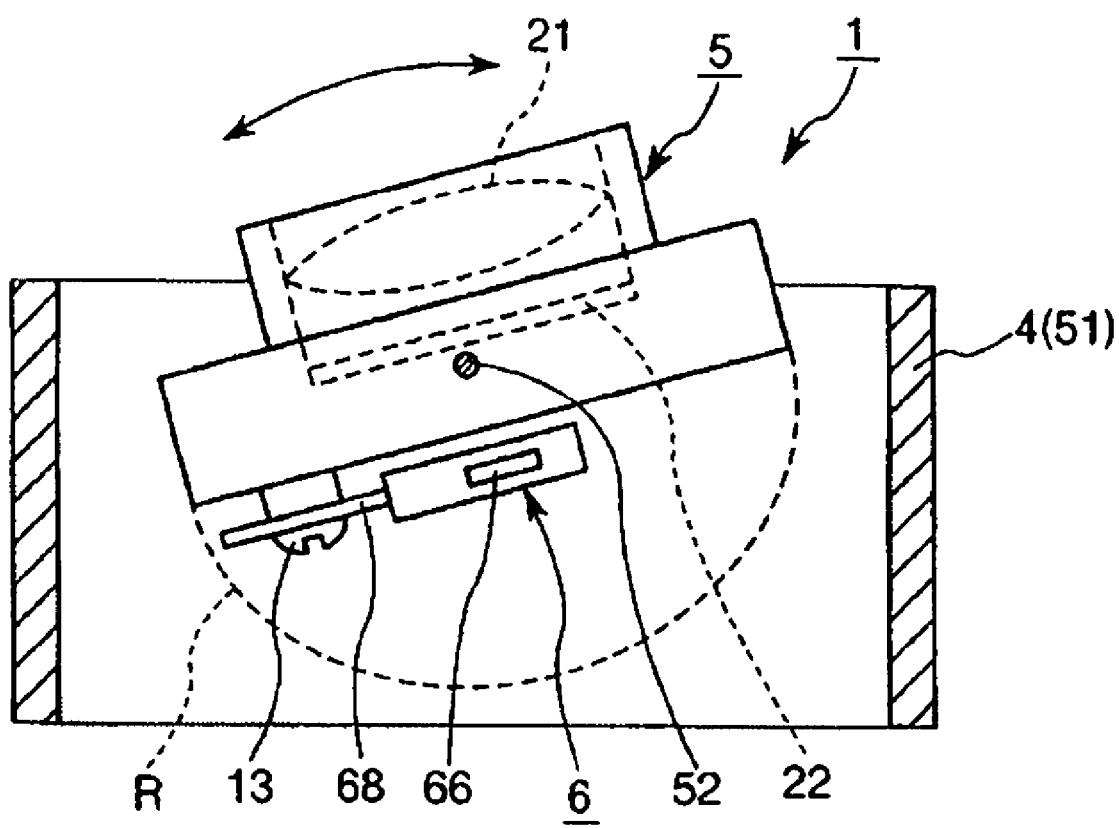
FIG. 26 is an explanatory drawing showing an action of the operating apparatus shown in FIG. 23.

FIG. 26 is an explanatory drawing showing an action of the operating apparatus shown in FIG. 23. In this operating apparatus 1, first, the vibrating element 6 undergoes vibration by application of a high-frequency alternating current from an outer conducting circuit (not shown) to strike the frame 4 on the inner wall surface by the contact portion 66. Then, the contact portion 66 of the vibrating element 6 comes into frictional contact with the inner wall surface 42 of the frame 4, and the vibrating element 6 itself is displaced by means of reactive force thereof. Since the vibrating element 6 is fixed on the driven element 5, the driven element 5 rotatively displaces around the shaft 52 together with the vibrating element 6. Thus, an imaging direction of the optical system 2 is changed toward a rotative direction of the driven element 5. As mentioned above, the vibrating element 6 does not protrude from the rotative excursion area R of the driven element 5 while the driven element 5 is driven. In this way, since a drive unit (i.e., the vibrating element 6) for the driven element 5 can be efficiently arranged at a narrow space, it is possible to make the operating apparatus 1 smaller and thinner. In addition, since the vibrating element 6 is provided on the bottom portion of the driven element 5, it is possible to make a width of the driven element 5 smaller when viewed from a top of the operating apparatus 1.

(Eighth Embodiment)

Figure 27:
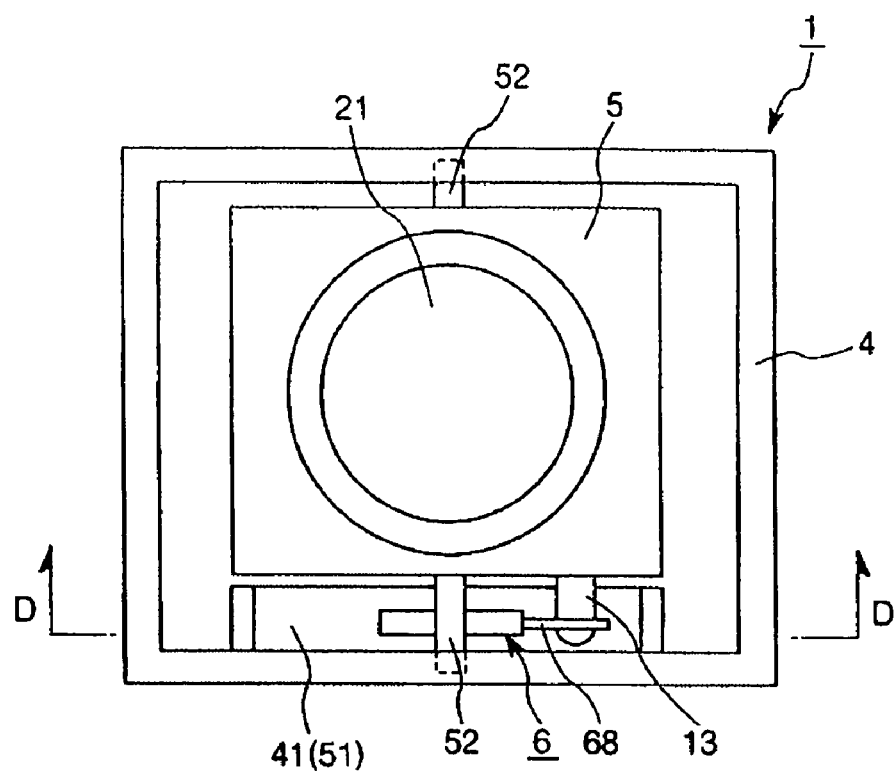
FIG. 27 is a plan view illustrating an operating apparatus in an eighth embodiment according to the present invention.
Figure 28:
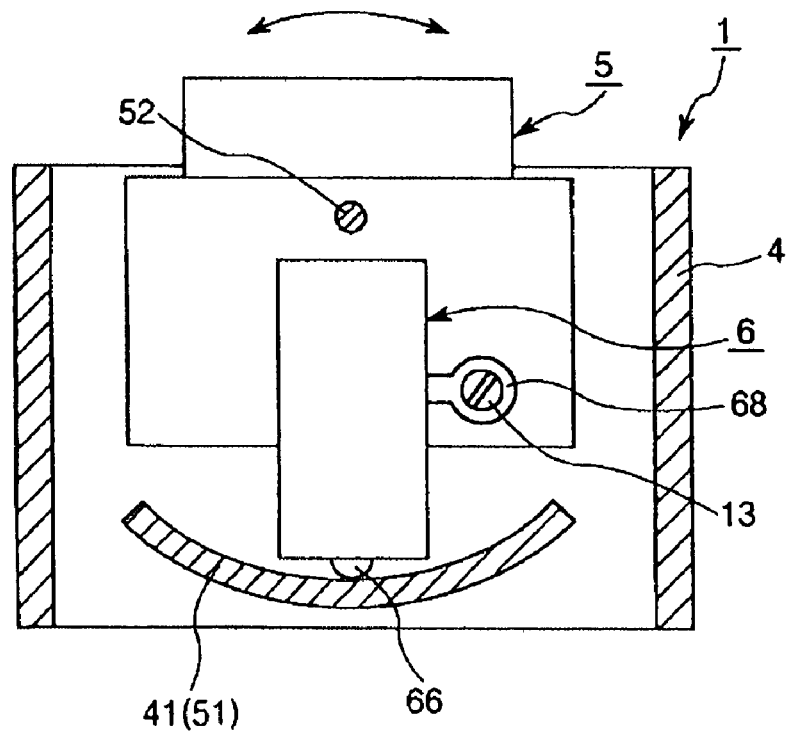
FIG. 28 is a cross-sectional view taken along line D—D of the operating apparatus shown in FIG. 27.

FIG. 27 is a plan view illustrating an operating apparatus in an eighth embodiment according to the present invention. FIG. 28 is a cross-sectional view taken along line D—D of the operating apparatus shown in FIG. 27. In these drawings, the same parts (components) as those of the operating apparatus 1 in the embodiments described above are designated as the same reference numerals, and explanations thereof will be omitted. In comparison with the operating apparatus 1 in the first embodiment described above, the operating apparatus 1 has a characteristic on the point that a substantially circular curve-shaped bank portion (protruding portion) 41 that protrudes from an inner wall surface of the frame 4 is provided on the inner wall surface and the protruding portion 41 constitutes a contacted element 51. A vibrating element 6 in this operating apparatus 1 is fixed on a side surface of the driven element 5 and under a shaft 52. A contact portion 66 of the vibrating element 6 is arranged so as to face an opposite side of the shaft 52 in a radial direction. Thus, when the driven element 5 is rotated around the shaft 52, the vibrating element 6 moves (displaces) so that the contact portion 66 displaces on a concentric circle with respect to the shaft 52. The contact portion 66 of the vibrating element 6 comes into frictional contact with the protruding portion 41 of the frame 4. The protruding portion 41 is formed along a excursion of the contact portion 66 so that the contact portion 66 does not drop off from the protruding portion 41 when the driven element 5 is rotated.

Figure 29:
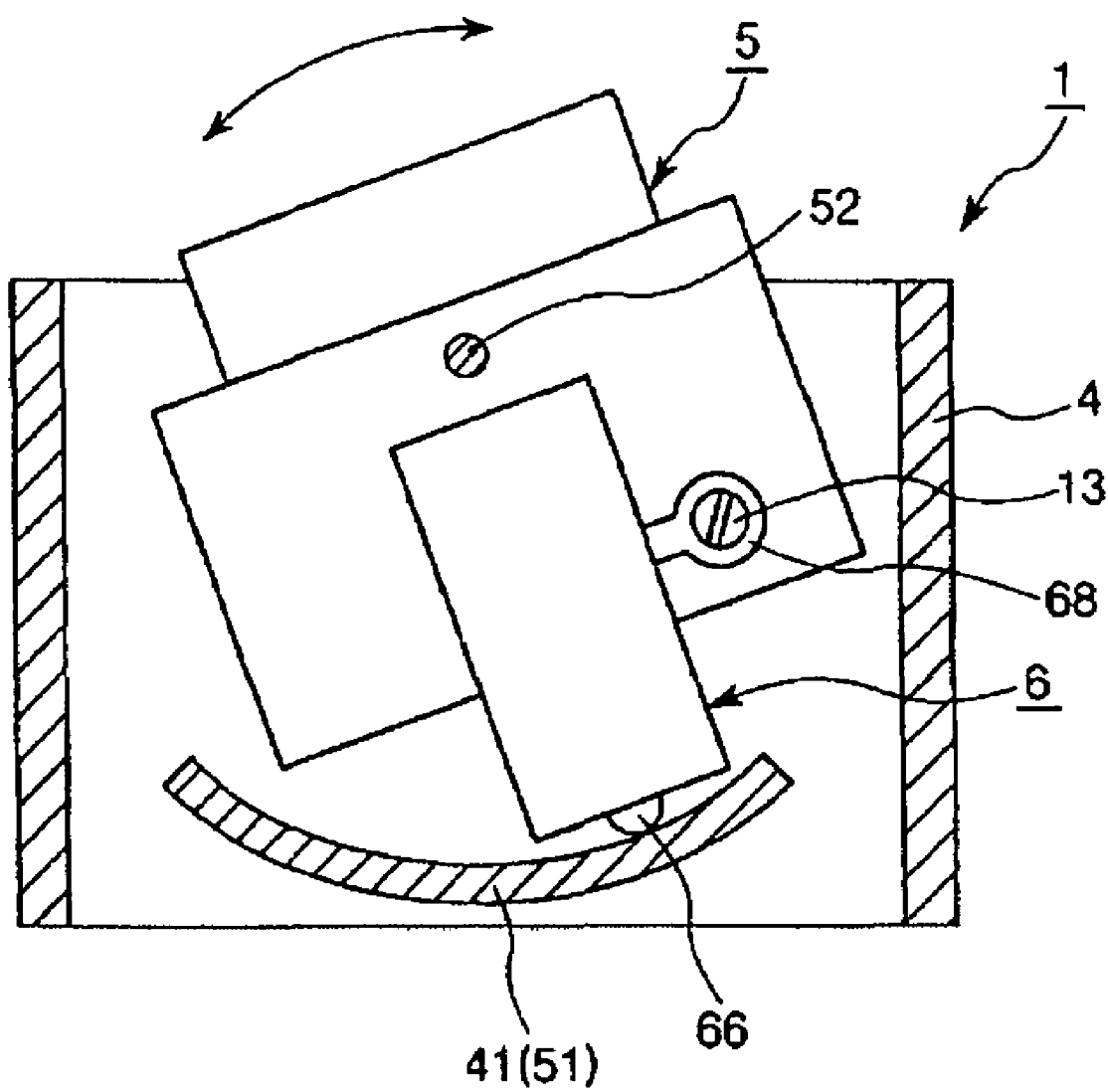
FIG. 29 is an explanatory drawing showing an action of the operating apparatus shown in FIG. 27.

FIG. 29 is an explanatory drawing showing an action of the operating apparatus shown in FIG. 27. In this operating apparatus 1, first, the vibrating element 6 undergoes vibration by application of a high-frequency current from an outer conducting circuit (not shown) to strike the frame 4 on the protruding portion 41. Then, the contact portion 66 of the vibrating element 6 comes into frictional contact with the protruding portion 41 of the frame 4, and the vibrating element 6 itself is displaced by means of reactive force thereof. Since the vibrating element 6 is fixed on the driven element 5, the driven element 5 rotatively displaces around the shaft 52 together with the vibrating element 6. Thus, an imaging direction of the optical system 2 is changed toward a rotative direction of the driven element 5.

(Ninth Embodiment)

Figure 30:
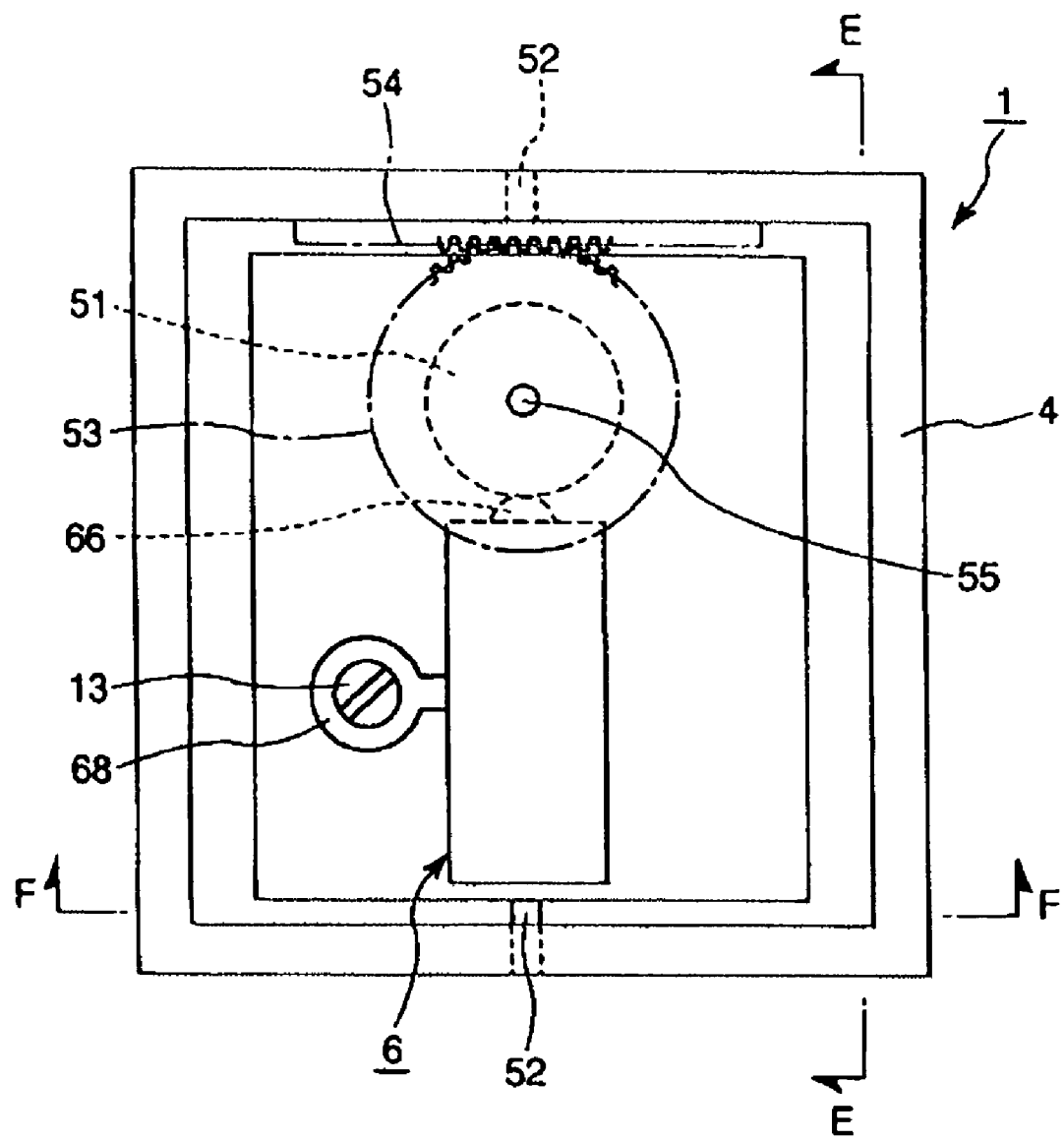
FIG. 30 is a bottom plan view illustrating an operating apparatus in a ninth embodiment according to the present invention.
Figure 31:
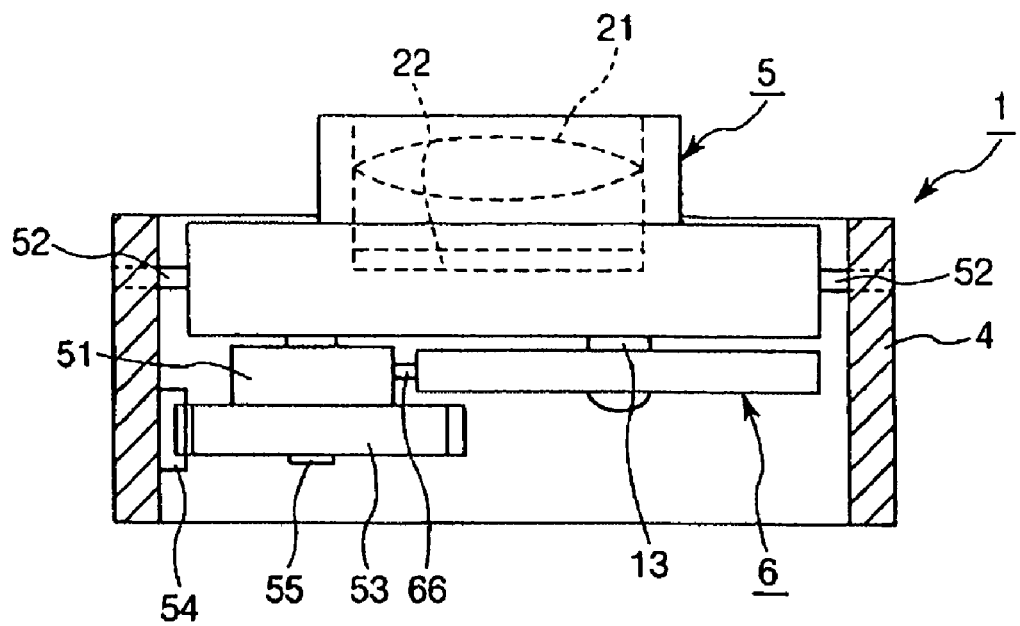
FIG. 31 is a cross-sectional view taken along line E—E of the operating apparatus shown in FIG. 30.
Figure 32:
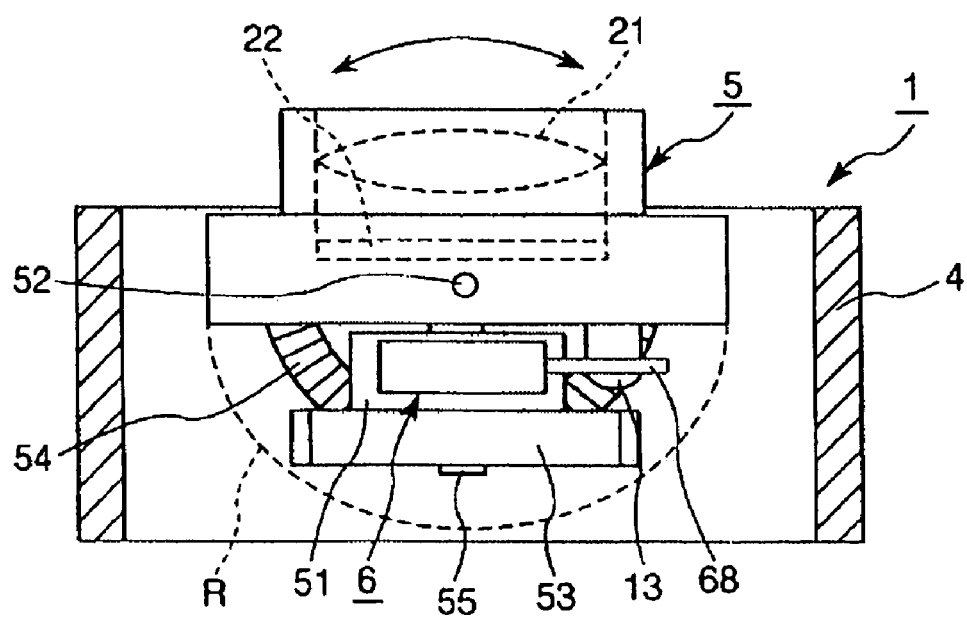
FIG. 32 is a cross-sectional view taken along line F—F of the operating apparatus shown in FIG. 30.

FIG. 30 is a bottom plan view illustrating an operating apparatus in a ninth embodiment according to the present invention. FIG. 31 is a cross-sectional view taken along line E—E of the operating apparatus shown in FIG. 30. FIG. 32 is a cross-sectional view taken along line F—F of the operating apparatus shown in FIG. 30. In these drawings, the same parts (components) as those of the operating apparatus 1 in the embodiments described above are designated as the same reference numerals, and explanations thereof will be omitted. In comparison with the operating apparatus 1 in the seventh embodiment described above, the operating apparatus 1 has a characteristic on the point to be provided with a deceleration mechanism between a vibrating element 6 and the frame 4. The vibrating element 6 is arranged on a bottom surface of the driven element 5. Further, a contacted element 51 is provided on the bottom surface of the driven element 5, which can rotate with respect to a shaft 55. A contact portion 66 of the vibrating element 6 comes into frictional contact with a circumferential surface of the contacted element 51. A gear 53 with a diameter larger than that of the contacted element 51 is fixed on the contacted element 51. The gear 53 rotates with respect to the shaft 55 together with the contacted element 51. A rack 54 is provided on the inner wall surface of the frame 4. The rack 54 has a substantial circular curve-shaped structure and in meshing engagement with the gear 53 of the contacted element 51. Further, the rack 54 is formed with a predetermined radius and length along a excursion of the gear 53 so that the rack 54 does not go out of engagement with the gear 53 when the driven element 5 is rotated around the shaft 52. The contacted element 51 and the gear 53 constitute the deceleration mechanism of the driven element 5. The vibrating element 6, contacted element 51 and the gear 53 are arranged within a rotative radius (i.e., a rotative excursion area R) of the driven element 5 (see FIGS. 32 and 33). In this way, since a drive unit of the driven element 5 (the vibrating element 6) can be efficiently positioned at a narrow space, it is possible to make the operating apparatus 1 smaller and thinner than the case where the drive unit is positioned at the outside of the operating apparatus 1.

Figure 33:
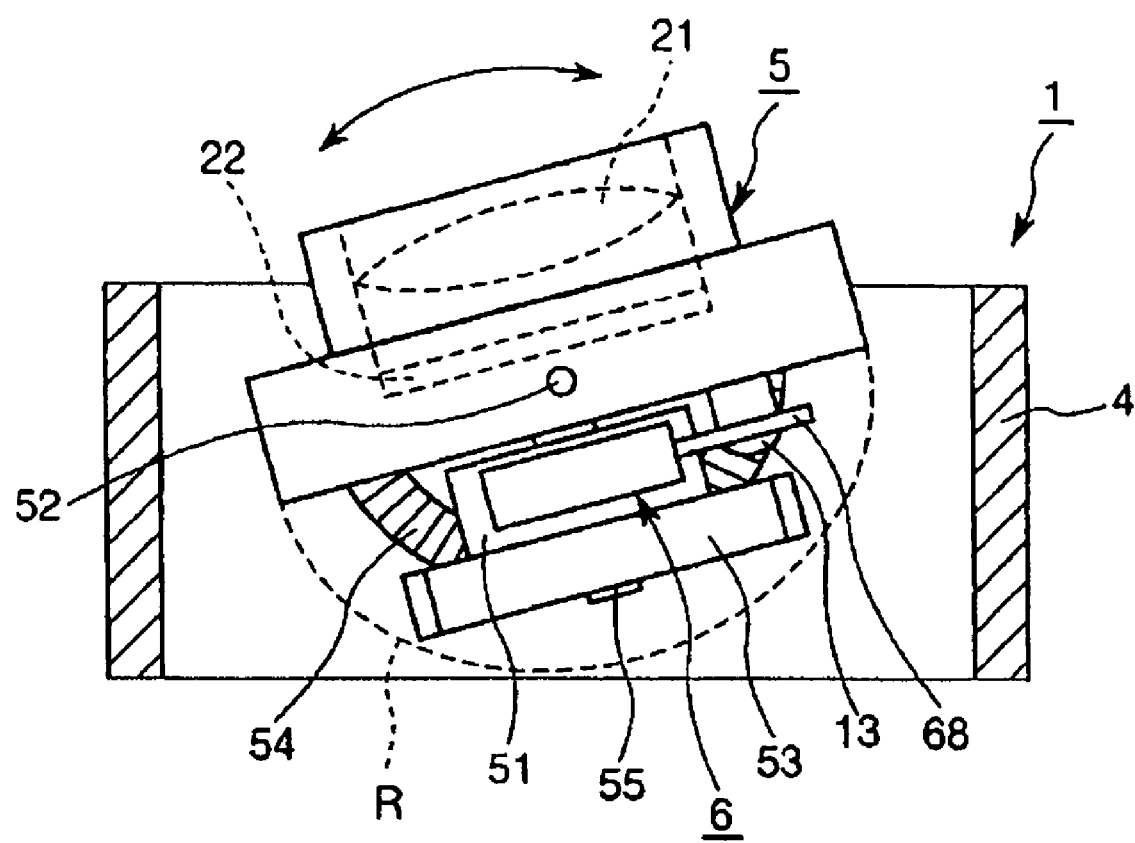
FIG. 33 is an explanatory drawing showing an action of the operating apparatus shown in FIG. 30.

FIG. 33 is an explanatory drawing showing an action of the operating apparatus shown in FIG. 30. In this operating apparatus 1, first, when the vibrating element 6 undergoes vibration by application of a high-frequency current from an outer conducting circuit 20 (not shown), the contacted element 51 is struck by the contact portion 66 of the vibrating element 6 to be rotated. Since the gear 53 is fixed on the contacted element 51, the gear 53 is rotated around the shaft 55 together with the contacted element 51. Then, the gear 53 engages with the rack 54, and the gear 53 itself is displaced by means of reactive force thereof. The contacted element 51 is rotatively displaced around the shaft 52 by means of the displacement of the gear 53. Thus, an imaging direction of the optical system 2 is changed toward a rotative direction of the driven element 5. According to the operating apparatus 1, it is possible to drive the contacted element 51 with high (great) torque by means of the deceleration mechanism. Further, it is possible to arbitrarily change a position of the vibrating element 6 with respect to the driven element 5 by changing the arrangement or size of the gear 53. This makes it possible to enhance flexibility (degree of freedom) of arrangement of the vibrating element 6.

(Tenth Embodiment)

Figure 35:
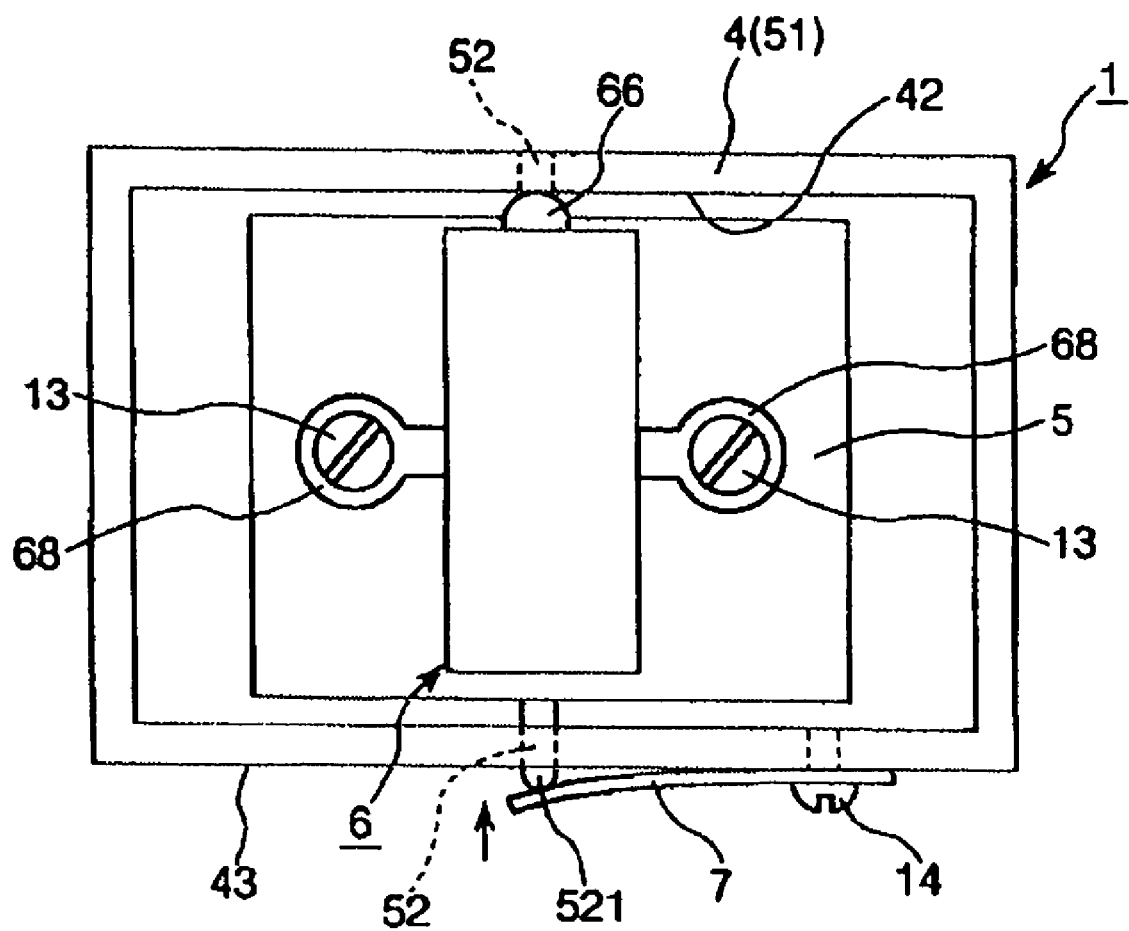
FIG. 35 is a bottom plan view illustrating an operating apparatus in a tenth embodiment according to the present invention.

FIG. 35 is a bottom plan view illustrating an operating apparatus in a tenth embodiment according to the present invention. In FIG. 35, the same parts (components) as those of the operating apparatus 1 in the embodiments described above are designated as the same reference numerals, and explanations thereof will be omitted. In comparison with the operating apparatus 1 in the seventh embodiment described above, the operating apparatus 1 has a characteristic on the point to be provided with a leaf spring (elastic member) 7 as pushing means for pushing one of a frame 4 (contacted element 51) and a vibrating element 6 toward the other, i.e., pushing means for pushing a contact portion 66 of the vibrating element 6 toward an inner wall surface 42 of the frame 4 by pushing the driven element 5.

The driven element 5 is supported in the frame 4 via shafts 52, 52 so as to be able to rotate around the shafts 52, 52 and to displace in an axial direction of the shaft 52. Further, one shaft 52 that is positioned at an opposite side of the contact portion 66 of the vibrating element 6 protrudes through the frame 4 toward the outside of the frame 4.

The leaf spring 7 is fixedly provided on an outer wall surface 43 of the frame 4 at a side opposite to the contact portion 66 of the vibrating element 6 so that a base end side of the leaf spring 7 is fixed on the frame 4 via a bolt (fixing member) 14. In this case, the leaf spring 7 is arranged at a state where a tip portion thereof abuts on a tip portion (protruding portion) 521 of the shaft 52 that is positioned at a side opposite to the contact portion 66 of the vibrating element 6 and therefore the corresponding part of the leaf spring 7 undergoes elastic deformation (i.e., the leaf spring 7 is curved). The shaft 52 of the driven element 5 is pushed toward a direction in which the contact portion 66 of the vibrating element 6 gets close to the inner wall surface 42 of the frame 4 (an upward direction in FIG. 35) by means of elastic force (restoring force) of the leaf spring 7. Namely, the driven element 5 and the vibrating element 6 are biased toward the upward direction in FIG. 35 by the elastic force of the leaf spring 7, whereby the contact portion 66 of the vibrating element 6 is in pushing contact with the inner wall surface 42 of the frame 4.

Further, similar to the operating apparatus 1 in the fifth embodiment described above, a pair of (two) arm portions 68, 68 each having elasticity (flexibility) are integrally formed on the reinforcing plate 63 of the vibrating plate 6.

According to the operating apparatus 1, it is possible to push the contact portion 66 of the vibrating element 6 toward the inner wall surface 42 of the frame 4 with a simplified structure (by a simple method). Since the contact portion 66 of the vibrating element 6 is pushed toward the inner wall surface 42 of the frame 4, it is possible to obtain greater torque (driving force). Therefore, it is possible to rotatively displace the driven element 5 surely. Further, it is possible to prevent shakiness in a radial direction of the driven element 5. This makes it possible to rotatively displace the driven element 5 smoothly. Moreover, it is possible to obtain effects similar to that of the fifth and seventh embodiments described above.

In this regard, the operating apparatus 1 in this embodiment is constructed so that the driven element 5 rotatively displaces (rotates) around one axis (i.e., the shaft 52), but the present invention is not limited to this structure. For example, by using a similar constitution and principle, the operating apparatus 1 may be constructed so that the driven element 5 rotatively displaces (rotates) around two axes whose directions are different from each other, in particular, around two axes that mutually cross at right angles.

As described above, it should be noted that, even though the operating apparatus and the electric instrument of the present invention have been described with reference to the preferred embodiments shown in the accompanying drawings, the present invention is not limited to these embodiments, it is of course possible to make various changes and modifications to each element of the operating apparatus, the electric instrument and various elements described above can be replaced with any other element capable of performing the same or a similar function.

In this regard, the present invention may combine any two or more constitutions (characteristics) in all the embodiments.

What is claimed is:

1. An operating apparatus comprising:
   a driven element;
   a frame which rotatably supports the driven element;
   a contacted element which is stationary with respect to the frame; and
   a vibrating element which includes a first piezoelectric element that undergoes extension and contraction by application of an AC voltage, a reinforcing plate having a contact portion and an arm portion, and a second piezoelectric element that undergoes extension and contraction by application of an AC voltage, the first piezoelectric element, the reinforcing plate and the second piezoelectric element being laminated in this order, and the vibrating element being fixedly mounted on the driven element in a state where the contact portion abuts on the contacted element;
   wherein the vibrating element receives reaction force from the contacted element when the vibrating element vibrates so that the driven element is rotated together with the vibrating element by means of the reaction force.

2. The operating apparatus as claimed in claim 1, wherein the contacted element is fixedly provided on the frame.

3. The operating apparatus as claimed in claim 1, wherein the vibrating element has a thin plate-shaped structure, and the contacted element and the vibrating element are provided in a substantially same plane.

4. The operating apparatus as claimed in claim 1, wherein the driven element has a side surface and the frame has an inner wall surface which is opposite to the side surface of the driven element through a gap therebetween, and the contacted element and the vibrating element are arranged within the gap.

5. The operating apparatus as claimed in claim 1, wherein the driven element has a bottom portion, and the vibrating element is provided on the bottom portion of the driven element.

6. The operating apparatus as claimed in claim 5, wherein the vibrating element is provided in an area in which the driven element rotates.

7. The operating apparatus as claimed in claim 1, wherein the contacted element forms a part of the frame.

8. The operating apparatus as claimed in claim 1, further comprising means for pushing one of the contacted element and the vibrating element toward the other.

9. The operating apparatus as claimed in claim 1, wherein the contacted element is a protruding portion provided on the inner wall surface of the frame.

10. The operating apparatus as claimed in claim 1, wherein the driven element is an imaging device having an optical system.

11. The operating apparatus as claimed in claim 1, wherein the driven element is a device for detecting sound.

12. The operating apparatus as claimed in claim 1, wherein the driven element is a device for adjusting the center of gravity.

13. The operating apparatus as claimed in claim 1, wherein the driven element is a radio-wave detecting device having a portion for receiving radio waves.

14. An operating apparatus comprising:
   a driven element on which a contacted element is rotatably provided;
   a frame which rotatably supports the driven element;
   a vibrating element which includes a first piezoelectric element that undergoes extension and contraction by application of an AC voltage, a reinforcing plate having a contact portion and an arm portion, and a second piezoelectric element that undergoes extension and contraction by application of an AC voltage, the first piezoelectric element, the reinforcing plate and the second piezoelectric element being laminated in this order, and the vibrating element being fixedly mounted on the driven element in a state where the contact portion abuts on the contacted element; and
   a decelerating mechanism provided between the contacted element and the frame;
   wherein the vibrating element transmits power to the driven element via the contacted element and the decelerating mechanism to rotate the driven element together with the vibrating element.

15. The operating apparatus as claimed in claim 14, wherein the driven element is an imaging device having an optical system.

16. The operating apparatus as claimed in claim 14, wherein the driven element is a device for detecting sound.

17. The operating apparatus as claimed in claim 14, wherein the driven element is a device for adjusting the center of gravity.

18. The operating apparatus as claimed in claim 14, wherein the driven element is a radio-wave detecting device having a portion for receiving radio waves.

19. An electric instrument provided with an operating apparatus, the operating apparatus comprising:
   a driven element;
   a frame which rotatably supports the driven element;
   a contacted element which is stationary with respect to the frame; and
   a vibrating element which includes a first piezoelectric element that undergoes extension and contraction by application of an AC voltage, a reinforcing plate having a contact portion and an arm portion, and a second piezoelectric element that undergoes extension and contraction by application of an AC voltage, the first piezoelectric element, the reinforcing plate and the second piezoelectric element being laminated in this order, and the vibrating element being fixedly mounted on the driven element in a state where the contact portion abuts on the contacted element;
   wherein the vibrating element receives reaction force from the contacted element when the vibrating element vibrates so that the driven element is rotated together with the vibrating element by means of the reaction force.

20. An electric instrument provided with an operating apparatus, the operating apparatus comprising:
   a driven element on which a contacted element is rotatably provided;
   a frame which rotatably supports the driven element;
   a vibrating element which includes a first piezoelectric element that undergoes extension and contraction by application of an AC voltage, a reinforcing plate having a contact portion and an arm portion, and a second piezoelectric element that undergoes extension and contraction by application of an AC voltage, the first piezoelectric element, the reinforcing plate and the second piezoelectric element being laminated in this order, and the vibrating element being fixedly mounted on the driven element in a state where the contact portion abuts on the contacted element; and
   a decelerating mechanism provided between the contacted element and the frame;
   wherein the vibrating element transmits power to the driven element via the contacted element and the decelerating mechanism to rotate the driven element together with the vibrating element.

* * * * *